US012340063B2

(12) United States Patent
Yoo et al.

(10) Patent No.: US 12,340,063 B2
(45) Date of Patent: Jun. 24, 2025

(54) METHOD AND SYSTEM FOR PROVIDING AVATAR SPACE BASED ON STREET-VIEW VIA INSTANT MESSAGING APPLICATION

(71) Applicant: LINE Plus Corporation, Seongnam-si (KR)

(72) Inventors: Jinhee Yoo, Seongnam-si (KR); Soo Jin An, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 252 days.

(21) Appl. No.: 17/950,536

(22) Filed: Sep. 22, 2022

(65) Prior Publication Data
US 2023/0101036 A1    Mar. 30, 2023

(30) Foreign Application Priority Data
Sep. 24, 2021 (KR) .......................... 10-2021-0126641

(51) Int. Cl.
| | | |
|---|---|---|
| *G06F 3/04815* | (2022.01) | |
| *G06F 3/04842* | (2022.01) | |
| *G06F 3/16* | (2006.01) | |
| *G06T 13/40* | (2011.01) | |
| *G06T 19/00* | (2011.01) | |
| *H04L 51/046* | (2022.01) | |

(52) U.S. Cl.
CPC ...... *G06F 3/04815* (2013.01); *G06F 3/04842* (2013.01); *G06F 3/16* (2013.01); *G06T 13/40* (2013.01); *G06T 19/006* (2013.01); *G06T 2200/24* (2013.01); *G06T 2219/024* (2013.01); *H04L 51/046* (2013.01)

(58) Field of Classification Search
None
See application file for complete search history.

(56) References Cited

U.S. PATENT DOCUMENTS

| | | | | |
|---|---|---|---|---|
| 6,229,533 | B1* | 5/2001 | Farmer | G06N 3/006 |
| | | | | 345/473 |
| 2018/0184038 | A1* | 6/2018 | Li | G06T 11/00 |
| 2019/0310757 | A1* | 10/2019 | Lee | H04N 7/157 |
| 2020/0219323 | A1* | 7/2020 | Varshney | H04L 51/52 |
| 2021/0149981 | A1* | 5/2021 | Heully | G06F 16/9577 |
| 2022/0005275 | A1* | 1/2022 | Atlas | G06F 3/0482 |
| 2022/0343409 | A1* | 10/2022 | Cali' | G06Q 30/0204 |

* cited by examiner

*Primary Examiner* — Yi Wang
(74) *Attorney, Agent, or Firm* — Sughrue Mion, PLLC

(57) ABSTRACT

A method includes receiving information on one or more avatar spaces, where the one or more avatar spaces are associated with at least one of a place and an event, and where the one or more avatar spaces are created based on a 360-degree view, and in response to a user input selecting the information on the one or more avatar spaces, outputting an avatar space that is created such that an avatar of a first user account associated with a user terminal is placed in a 360-degree view image associated with at least one of the place and the event.

18 Claims, 20 Drawing Sheets

METHOD AND SYSTEM FOR PROVIDING AVATAR SPACE BASED ON STREET-VIEW VIA INSTANT MESSAGING APPLICATION

CROSS-REFERENCE TO RELATED APPLICATION

This application is based on and claims priority under 35 U.S.C. § 119 to Korean Patent Application No. 10-2021-0126641, filed on Sep. 24, 2021, in the Korean Intellectual Property Office, the disclosure of which is incorporated herein by reference in its entirety.

BACKGROUND

1. Field

The present disclosure relates generally to a method and a system for providing an avatar space based on a street-view via an instant messaging application, and in particular, to a method and a system for outputting an avatar space created such that one or more user avatars are placed in a street-view image.

2. Description of Related Art

With the widespread use of mobile devices such as smartphones and the like and the development of the Internet, people may easily communicate with each other online. Specifically, communication with other people may be performed by chat, or by making a voice call or video call with other people via an instant messaging application. In addition, communication with an unspecified number of people with common interests may also be performed through open chat of the instant messaging application.

However, communication through text and voice alone may have limitations in expressing individual's personality, and video calls may have a risk of personal information being exposed. In order to solve this problem, in recent years, a service is emerging, which creates a three-dimensional (3D) virtual space online and enables users to communicate with other users using avatars that express user's personality. However, creating a 3D virtual space online may require much time and money.

The number of users who enjoy video services using mobile devices and the like is increasing. Such a video service was basically a service that a video producer delivers videos in one direction to a user watching the videos. Recently, more users want to participate in video broadcast content, and further, live broadcast content, and in order to satisfy this need, an interactive service is disclosed, which provides a messenger such as a chat or the like together with a video. However, with these services alone, it may be difficult for a user to directly participate in a video such as a live broadcast and the like, without exposing personal information such as his/her appearance and the like.

SUMMARY

Provided are a method a system, and a non-transitory computer-readable recording medium storing instructions for providing an avatar space based on a street-view.

According to an aspect of the disclosure, a method may include receiving information on one or more avatar spaces, where the one or more avatar spaces are associated with at least one of a place and an event, and where the one or more avatar spaces are created based on a 360-degree view, and in response to a user input selecting the information on the one or more avatar spaces, outputting an avatar space that is created such that an avatar of a first user account associated with a user terminal is placed in a 360-degree view image associated with at least one of the place and the event.

The method may include creating a target avatar space associated with at least one of a target place and a target event, and the created target avatar space may include an avatar space searchable by a search word associated with at least one of the target place and the target event.

The method may include transmitting a request to share link information of the output avatar space to a second user account associated with the first user account.

The method may include prior to outputting the avatar space, receiving one or more candidate avatars randomly recommended for the first user account, and receiving a user input selecting one of the received one or more candidate avatars as the avatar of the first user account.

The method may include prior to outputting the avatar space, receiving candidate parts to be applied to the avatar of the first user account, where the candidate parts are associated with at least one of the avatar space and a current viewpoint, and in response to a user input selecting one of the received candidate parts, outputting an avatar space including an avatar applied with the selected one on the received candidate parts.

The avatar of the first user account may be placed in a predetermined area in the 360-degree view image, and the method may include, in response to a user input selecting a movement-related indication in the 360-degree view image in the output avatar space, outputting an avatar space in which map information of the 360-degree view image is changed while the avatar of the first user account remains to be placed in the predetermined area.

The output avatar space may include avatars of one or more third user accounts placed in the 360-degree view image, and the first user account may be different from the one or more third user accounts.

The method may include receiving a user input selecting an avatar of the one or more third user accounts placed in the 360-degree view image, and in response to the user input selecting the avatar of the one or more third user accounts placed in the 360-degree view image, outputting at least one of information on clothes the selected avatar is wearing and a gesture set for the selected avatar.

The method may include outputting, in the avatar space, an interface that enables a chat with the one or more third user accounts.

The method may include receiving a user input selecting an avatar of the one or more third user accounts placed in the 360-degree view image, and transmitting a request for one-to-one conversation with the selected avatar.

The method may include receiving a user input selecting a voice-related indication displayed around one of the avatars of one or more third user accounts placed in the 360-degree view image, and in response to the user input selecting the voice-related indication, outputting a voice message associated with the one of the avatars of one or more third user accounts placed in the 360-degree view image.

The method may include capturing an image of the avatar of the first user account and the avatar of the one or more third user accounts in the avatar space.

The method may include outputting a plurality of candidate gestures associated with the avatar of the first user account, selecting one of the outputted plurality of candidate gestures, and outputting the avatar space including the avatar of the first user account applied with the selected gesture.

The avatar space may include one or more items, and the method may include acquiring, by the avatar of the first user account, one of the one or more items in the avatar space, and outputting the avatar space in which the avatar of the first user account applied with the acquired of the one or more items in the avatar space is placed.

The avatar space may include an indoor view of a store, and the method may include receiving, by the avatar of the first user account, a user input selecting at least one of a plurality of products provided by the store in the avatar space, and transmitting a purchase request for the selected at least one of the plurality of products.

The receiving the information on the one or more avatar spaces may include receiving information on a search word associated with at least one of the place or the event, and receiving information on one or more avatar spaces searched based on the search word.

The information on the one or more avatar spaces may include a list of a plurality of avatar spaces, and the list of the plurality of avatar spaces may be sorted and output according to a predetermined criterion.

According to an aspect of the disclosure, a non-transitory computer-readable recording medium may store instructions that, when executed by one or more processors, cause the one or more processors to receive information on one or more avatar spaces, where the one or more avatar spaces are associated with at least one of a place and an event, and where the one or more avatar spaces are created based on a 360-degree view, and in response to a user input selecting the information on the one or more avatar spaces, output an avatar space that is created such that an avatar of a first user account associated with a user terminal is placed in a 360-degree view image associated with at least one of the place and the event.

According to an aspect of the disclosure, an information processing system may include at least one memory storing instructions, and at least one processor configured to execute the instructions to transmit information on one or more avatar spaces, where the one or more avatar spaces are associated with at least one of a place and an event, and where the one or more avatar spaces are formed based on a 360-degree view, in response to a request from a user terminal selecting information on the one or more avatar spaces, transmit a 360-degree view image associated with at least one of the place and the event to the user terminal, and generate an avatar space such that an avatar of a first user account associated with the user terminal is placed in the 360-degree view.

The avatar space may include an avatar of one or more second user accounts placed in the 360-degree view image, and the first user account may be different from the one or more second user accounts.

The effects of the present disclosure are not limited to those described above, and other effects that are not mentioned above may be clearly understood to those skilled in the art based on the description provided below.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
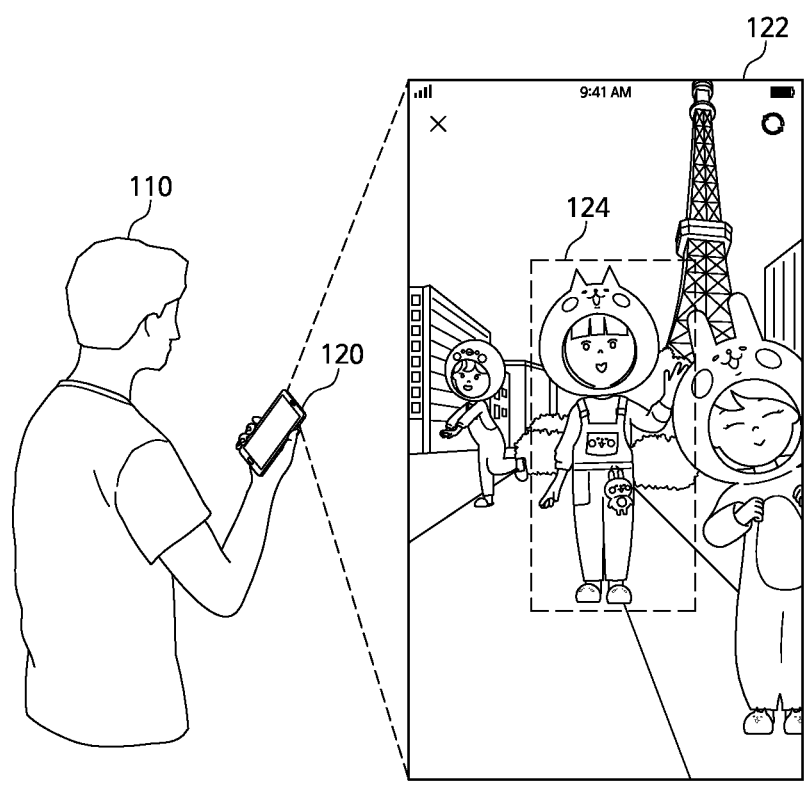
FIG. 1 is a diagram of an example of an avatar space based on a street-view, provided by a user through a user terminal according to an embodiment.

Hereinafter, specific details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any embodiment.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed embodiment(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the embodiment(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, if a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor may read information from and/or write information to the memory. The memory integrated with the processor is in electronic communication with the processor.

In the present disclosure, an "avatar space" may refer to a virtual space or group in which one or more users (or user accounts) may participate, which may be created in an instant messaging application installed on a computing device. The avatar space may be associated with at least one of a place or an event. The avatar space is a space in which avatars of one or more user accounts are placed in the street-view image, and those avatar may be movable in the avatar space, and various types of messages, voice data, and the like may be exchanged between the avatars in the avatar space. In the avatar space, in addition to the chat function, various functions such as a voice messaging function, a gesture function, an item acquisition function, an image capturing function, a shopping function, a live broadcasting function (VoIP real-time video transmission function), and the like may be provided.

In the present disclosure, a "user account" may refer to a user terminal used by a user or any user account associated with an application installed in the user terminal. The user account may represent an account created and used by the user in the instant messaging application or information related thereto. In addition, a user account associated with an avatar participating in a video may refer to a user who owns the avatar and make it participate in the video. Likewise, a user who make an avatar participate in a video may refer to a user account associated with the avatar. In addition, the user account may refer to a user account associated with a screen of the user terminal. In addition, while a plurality of user accounts are used separately from the user account, the plurality of user accounts may include the user accounts. In addition, a user account of a given application may refer to a user who uses the given application. Likewise, a user of a given application may refer to a user account of the given application.

In the present disclosure, a "street-view" or a "street-view image" may refer to a street-view or a road view around a designated place, or an image showing such a view. The designated place may be associated with an event. In addition, the street-view may be created using a plurality of external images (e.g., images captured from a satellite and the like) and/or a plurality of indoor images, and the like. For example, the street-view may include an outdoor street-view or an indoor street-view. In addition, the street-view may provide the user with a 360-degree real-world view of the corresponding place, and the user may move within the street-view using movement-related indications (e.g., bidirectional arrows, and the like). This street-view may be created/stored in advance, and the stored street-view may be used when the avatar space is created.

In the present disclosure, a "video" may refer to any video or associated video content that one or more users (or user accounts) may participate in, and may include a video already stored in the user terminal, a video received in real time through a streaming broadcast, a video received in real time through an Internet live broadcast, and the like, for example. The avatars of one or more user accounts may be displayed as separate objects in the video in an overlapping manner. In addition, the avatars in the video may exchange various types of messages, voice data, and the like with each other. In addition, one or more users participating in a video may include a video producer. The "video producer" may refer to a user (creator) associated with the production of the video, a user (master user or administrator) granted with certain rights, and/or a user terminal associated with such a user.

According to some examples, an avatar space associated with a place or event may be created based on an already created street-view, thereby quickly creating a new virtual space (avatar space) at a low cost.

According to some examples, without going to the actual place, the user may use his or her avatar to visit the place he or she wants to visit in the avatar space expressed in a street-view and perform various avatar activities in the place, from which the user may be provided with a better sense of reality or presence than in the related virtual space.

According to some examples, the user may have a conversation with a large number of people who are interested in the real place or event in the avatar space associated with the real place, thereby communicating with a consensus formed, and the user may create an image in the avatar space by capturing images, which further improves the user's interest.

According to some examples, the user may communicate with a plurality of people participating in the avatar space with text as well as voice or avatar action, thereby having improved sense of reality or presence compared to activities in the related virtual space.

According to some examples, the user may acquire or purchase an item associated with a real place and/or event in the avatar space associated with the real place, thereby having improved immersion and interest in the avatar space.

FIG. 1 is a diagram of an example of an avatar space based on a street-view, provided by a user 110 through a user terminal 120 according to an embodiment. The user 110 may receive an avatar space 122 based on street-view via an instant messaging application operating on the user terminal 120. The avatar space 122 may be created such that avatars of one or more user accounts are placed in a street-view image associated with at least one of a place or an event. For example, the avatar space 122 may be received from an information processing system that provides the instant messaging application. The avatar space received as described above may be output or displayed through a display device of the user terminal 120. The term "street-view" may refer to a panoramic view, a 360-degree view, a 360-degree panoramic view, or a three-dimensional (3D) 360-degree view of a place and surroundings of the place. The term "street-view" is not limited only to a view including a street or a road, and may include a view of any place. The term "street view image" may refer to a panoramic image, a 360-degree image, a 360-degree panoramic image, or a 3D 360-degree image of a place and surroundings of the place. The term "street view image" is not limited only to an image including a street or a road, and may include an image that captures any place and surroundings of the place.

The avatar space 122 may be associated with a place. The avatar space 122 may be associated with real places such as "Tokyo Olympic Stadium", "Eiffel Tower", "Gwanghwamun Square", and the like, and may be created based on a street-view image of spaces around or inside the real places. In addition, in the street-view image, avatars of user accounts who want to participate in the avatar space 122 may be placed. For example, as illustrated in FIG. 1, it may be seen that in the avatar space 122, three avatars are placed in a street-view image around the Eiffel Tower.

Additionally or alternatively, the avatar space 122 may be created based on a street-view in association with an event. The avatar space 122 may be created based on a street-view corresponding to spaces around or inside a place where an event such as the "Tokyo Olympics", "Han River Fireworks Festival", "concert", and the like occurs. The avatar space 122 created based on the street-view may be created so as to express the spaces around or inside a place in a 360-degree panoramic image centering on one avatar (e.g., avatar of user himself/herself). For example, the avatar space 122 may be created based on a street-view that displays the spaces inside a performance hall where an event such as a "concert" is performed, in the form of a panoramic image that is movable within 360 degrees.

The avatar space 122 may be created as a plurality of spaces associated with one place and/or one event. For example, the avatar space 122 may be created as a public avatar space where unspecified user accounts may participate. As another example, it may be created as a private avatar space with a limited access that allows participation of only a specific user account.

An avatar 124 of a user account may be placed in the avatar space 122 and output through the user terminal. As illustrated, the avatar space 122 may be displayed on the display of the user terminal. In addition, in the avatar space 122, avatars of user accounts different from the user account may be placed. For example, as illustrated in FIG. 1, an avatar 124 of a user account may be placed in a predetermined area of the avatar space (e.g., a central area of a roadmap image, and the like). The other avatars may be placed in areas other than the area in which the avatar 124 is placed in the avatar space. With such a configuration, the avatar space 122 may be easily and quickly created using a pre-stored street-view without the need to create a three dimensional (3D) virtual space. In addition, without going to the actual place, the user 110 may use his or her avatar to visit the place he or she wants to visit in the avatar space 122 expressed in a street-view and perform various avatar activities in the place, from which the user may be provided with a better sense of reality or presence than in the related virtual space.

Figure 2:
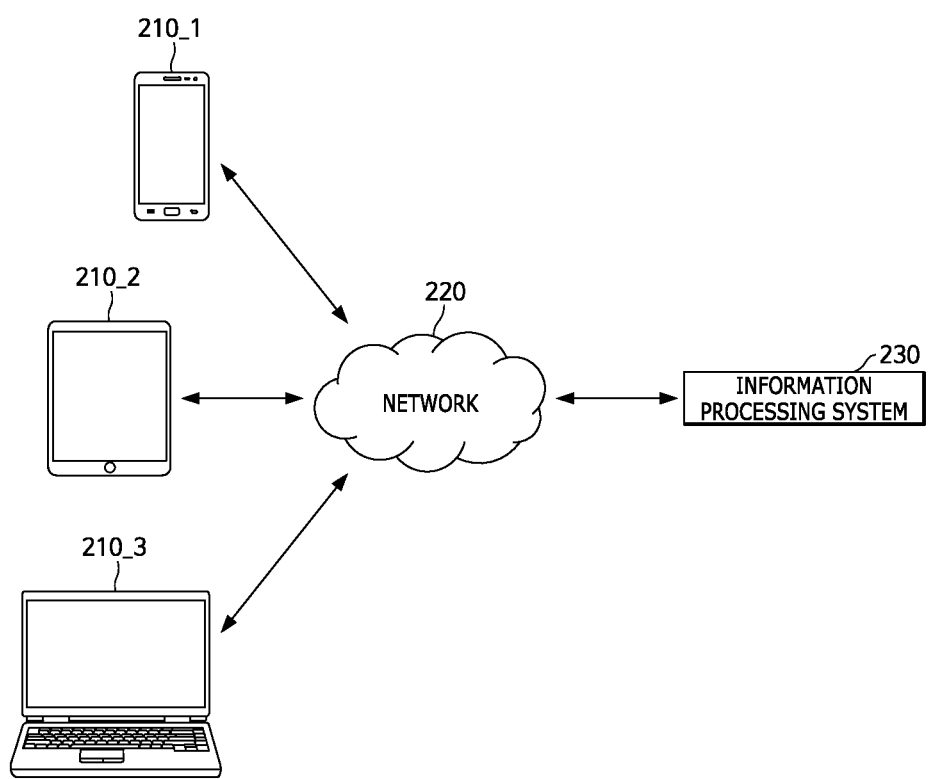
FIG. 2 is a diagram a configuration in which an information processing system is communicatively connected with a plurality of user terminals in order to provide an avatar space based on a street-view and/or a video using the avatar according to an embodiment.

FIG. 2 is a diagram of a configuration in which an information processing system 230 is communicatively connected to a plurality of user terminals 210_1, 210_2 and 210_3 to provide an avatar space based on a street-view and/or a video using an avatar according to an embodiment. The information processing system 230 may include a system capable of providing the plurality of user terminals 210_1, 210_2, and 210_3 with an avatar space based on a street-view and/or a video using the avatar through a network 220. The information processing system 230 may include one or more server devices and/or databases, or one or more distributed computing devices and/or distributed databases based on cloud computing services that may store, provide and execute computer-executable programs (e.g., downloadable applications) and data. In the present disclosure, while it is described that the video service using an avatar is provided via the instant messaging application, aspects are not limited thereto, and the video service using the avatar may be provided through a video-only application or any other service application that provides video.

The plurality of user terminals 210_1, 210_2, and 210_3 may communicate with the information processing system 230 through the network 220. The network 220 may be configured to enable communication between a plurality of user terminals 210 and the information processing system 230. The network 220 may be configured as a wired network 220 such as Ethernet, a wired home network (Power Line Communication), a telephone line communication device and RS-serial communication, a wireless network 220 such as a mobile communication network, a wireless local area network (WLAN), Wi-Fi, Bluetooth, and ZigBee, or a combination thereof, depending on the installation environment. The method of communication may include a communication method using a communication network (e.g., mobile communication network, wired Internet, wireless Internet, broadcasting network, satellite network, and the like) that may be included in the network 220 as well as short-range wireless communication between the user terminals 210_1, 210_2, and 210_3, but aspects are not limited thereto. For example, the network 220 may include any one or more of networks including a personal area network (PAN), a local area network (LAN), a campus area network (CAN), a metropolitan area network (MAN), a wide area network (WAN), a broadband network (BBN), the Internet, and the like. In addition, the network 220 may include any one or more of network topologies including a bus network, a star network, a ring network, a mesh network, a star-bus network, a tree or hierarchical network, and the like, but not limited thereto.

In FIG. 2, a mobile phone terminal 210_1, a tablet terminal 210_2, and a personal computer (PC) terminal 210_3 are illustrated as the examples of the user terminals, but aspects are not limited thereto, and the user terminals 210_1, 210_2, and 210_3 may be any computing device that is capable of wired and/or wireless communication and that may be installed with any application (e.g., instant messaging application) and execute the same. For example, the user terminal may include a smartphone, a mobile phone, a navigation system, a computer, a notebook computer, a digital broadcasting terminal, personal digital assistants (PDA), a portable multimedia player (PMP), a tablet PC, a game console, a wearable device, an internet of things (IoT) device, a virtual reality (VR) device, an augmented reality (AR) device, and the like. In addition, while FIG. 2 illustrates three user terminals 2101, 2102, and 210_3 in communication with the information processing system 230 through the network 220, the aspects are not limited thereto, and accordingly, a different number of the user terminals 210_1, 210_2, and 210_3 may be configured to be in communication with the information processing system 230 through the network 220.

The information processing system 230 may provide information on one or more avatar spaces created based on the street-view to the user terminal on which the instant messaging application is operated. The user terminal may provide the information processing system 230 with information on an avatar space that is selected by the user from the information on one or more avatar spaces. If the information on the selected avatar space is received, the information processing system 230 may provide the selected avatar space to the user terminal. The avatar space may include a street-view image associated with a corresponding place and/or event, and one or more avatars included or participating in the avatar space.

According to another example, the information processing system 230 may receive a request to receive a video associated with at least one of a place or an event from the user terminal. In response, the information processing system 230 may provide the requested video to the user terminal. The user terminal may output a user interface for selecting an avatar of a user account associated with the user terminal. If the user selects the avatar, the user may receive information about the user account from the information processing system 230. A video with the received avatar of the user account displayed thereon may be output through the user terminal. For example, the video with the avatar of the user account displayed thereon may be created by the information processing system 230 and provided to the user terminal. The video may include avatars of one or more other user accounts.

Figure 3:
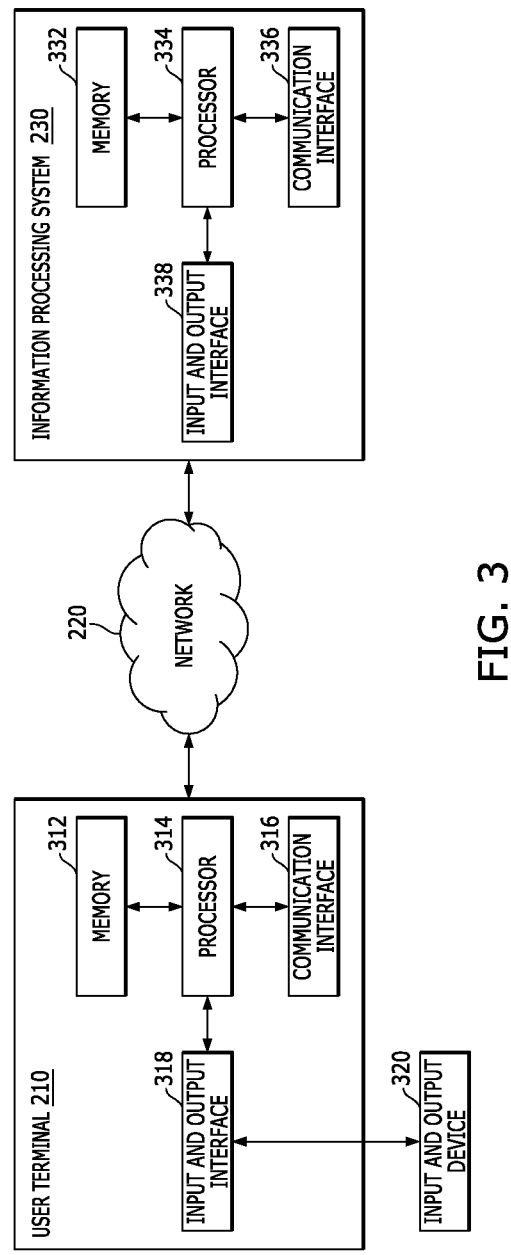
FIG. 3 is a block diagram of an internal configuration of the user terminal and the information processing system according to an embodiment.

FIG. 3 is a block diagram of an internal configuration of the user terminal 210 and the information processing system 230 according to an embodiment. The user terminal 210 may refer to any computing device that is capable of executing the instant messaging application and also capable of wired/wireless communication, and may include the mobile phone terminal 210_1, the tablet terminal 210_2, and the PC terminal 210_3 of FIG. 2, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using the respective communication modules 316 and 336. In addition, an input and output device 320 may be configured to input information and/or data to the user terminal 210 or to output information and/or data created from the user terminal 210 through the input and output interface 318.

The memories 312 and 332 may include any non-transitory computer-readable recording medium. The memories 312 and 332 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is distinct from the memory. In addition, an operating system and one or more program codes (e.g., a code for the instant messaging application, and the like installed and driven in the user terminal 210, a video service application using an avatar, and the like) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a digital versatile disc (DVD)/compact disc (CD)-ROM drive, a memory card, and so on, for example. As another example, the software components may be loaded into the memories 312 and 332 through the communication modules rather than the computer-readable recording medium. For example, at least one program may be loaded into the memories 312 and 332 based on a computer program (e.g., an application that provides an avatar space service based on a street-view, an application that provides a video service using an avatar, and the like) installed by files provided by developers or a file distribution system that distributes the installation files of an application through the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to a program code stored in a recording device such as the memories 312 and 332.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or other system (e.g., a separate cloud system, a street-view storage system, a video storage system, and the like). For example, a request (e.g., a request to share an avatar space, a request to share a video link, and the like) created by the processor 314 of the user terminal 210 according to the program code stored in the recording device such as the memory 312 or the like may be transmitted to the information processing system 230 through the network 220 under the control of the communication module 316. Conversely, a control signal or a command provided under the control of the processor 334 of the information processing system 230 may be received by the user terminal 210 through the communication module 316 of the user terminal 210 through the communication module 336 and the network 220. For example, the user terminal 210 may be provided with an avatar space service based on a street-view and/or a video service using an avatar by the information processing system 230 through the communication module 316.

The input and output interface 318 may be a means for interfacing with the input and output device 320. As an example, the input device may include a device such as a camera including an image sensor, a keyboard, a microphone, a mouse, and so on, and the output device may include a device such as a display, a speaker, a haptic feedback device, and so on. As another example, the input and output interface 318 may be a means for interfacing with a device such as a touch screen or the like that integrates configurations or functions for performing inputting and outputting. For example, if the processor 314 of the user terminal 210 processes the instructions of the computer program loaded in the memory 312, a service screen, which is configured with the information and/or data provided by the information processing system 230 or other user terminals 210, may be displayed on the display through the input and output interface 318. While FIG. 3 illustrates that the input and output device 320 is not included in the user terminal 210, aspects are not limited thereto, and an input and output device may be configured as one device with the user terminal 210. In addition, the input and output interface 338 of the information processing system 230 may be a means for interfacing with a device for inputting or outputting that may be connected to, or included in the information processing system 230. While FIG. 3 illustrates the input and output interfaces 318 and 338 as the components configured separately from the processors 314 and 334, aspects are not limited thereto, and the input and output interfaces 318 and 338 may be configured to be included in the processors 314 and 334.

The user terminal 210 and the information processing system 230 may include more than those components illustrated in FIG. 3. Most of the related components may not necessarily require exact illustration. The user terminal 210 may be implemented to include at least a part of the input and output device 320 described above. In addition, the user terminal 210 may further include other components such as a transceiver, a global positioning system (GPS) module, a camera, various sensors, a database, and the like. For example, if the user terminal 210 is a smartphone, it may include components generally included in the smartphone. For example, in an implementation, various components such as an acceleration sensor, a gyro sensor, a camera module, various physical buttons, buttons using a touch panel, input and output ports, a vibrator for vibration, and so on may be further included in the user terminal 210.

The processor 314 of the user terminal 210 may be configured to operate an instant messaging application that provides an avatar space service based on a street-view, any application that provides a video service using an avatar, or a web browser application that provides such services. A program code associated with the corresponding application may be loaded into the memory 312 of the user terminal 210. While the application is running, the processor 314 of the user terminal 210 may receive information and/or data provided from the input and output device 320 through the input and output interface 318 or receive information and/or data from the information processing system 230 through the communication module 316, and process the received information and/or data and store it in the memory 312. In addition, such information and/or data may be provided to the information processing system 230 through the communication module 316.

While the application is running, the processor 314 may receive texts, images, and the like, which may be inputted or selected through the input device 320 such as a touch screen, a keyboard, and the like connected to the input and output interface 318, and store the received texts, and/or images in the memory 312 or provide them to the information processing system 230 through the communication module 316 and the network 220. For example, the processor 314 may receive a request for selecting information on an avatar space created based on a street-view, and the like through an input device such as a touch screen or a keyboard. Accordingly, the received request or related information may be provided to the information processing system 230 through the communication module 316 and the network 220.

The processor 314 of the user terminal 210 may be configured to manage, process, and/or store the information and/or data received from the input and output device 320, another user terminal, the information processing system 230 and/or a plurality of external systems. The information and/or data processed by the processor 314 may be provided to the information processing system 230 through the communication module 316 and the network 220. The processor 314 of the user terminal 210 may transmit the information and/or data to the input and output device 320 through the input and output interface 318 to output the same. For example, the processor 314 may be configured to display the received information and/or data on the screen of the user terminal.

The processor 334 of the information processing system 230 may be configured to manage, process, and/or store information and/or data received from the plurality of user terminals 210 and/or a plurality of external systems. The information and/or data processed by the processor 334 may be provided to the user terminals 210 through the communication module 336 and the network 220. While the information processing system 230 is illustrated as a single system in FIG. 3, aspects are not limited thereto, and it may include a plurality of systems and servers for providing various services associated with the avatar space providing service based on a street-view, a video service using an avatar, and the like. For example, the information processing system 230 may include a separate server and the like including a map providing system, a video providing system, and the like.

Figure 4:
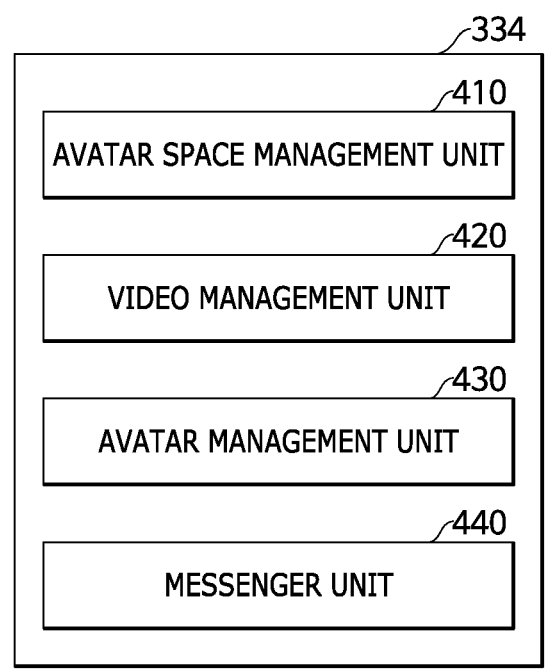
FIG. 4 is a block diagram of an internal configuration of a processor according to an embodiment.

FIG. 4 is a block diagram of an internal configuration of the processor 334 according to an embodiment. As illustrated, the processor 334 may include an avatar space management unit 410, a video management unit 420, an avatar management unit 430, and a messenger unit 440. While FIG. 4 illustrates that the avatar space management unit 410, the video management unit 420, the avatar management unit 430, and the messenger unit 440 operated in the processor 334 as separate units, aspects are not limited thereto, and any combination of the avatar space management unit 410, the video management unit 420, the avatar management unit 430, and the messenger unit 440 may be operated as one unit. Additionally or alternatively, each of the avatar space management unit 410, the video management unit 420, the avatar management unit 430, and the messenger unit 440 may be implemented as two or more sub-units.

The avatar space management unit 410 may receive a request to create an avatar space associated with a place and/or an event. In response to such a request, the avatar space management unit 410 may receive a street-view image associated with the place and/or the event. Using the received street-view image, the avatar space management unit 410 may place one or more avatars to create an avatar space. Information on one or more avatars may be received by the avatar management unit 430. For example, the avatar space may be created such that an avatar associated with a user terminal receiving the avatar space is placed in a predetermined area in the avatar space.

The avatar space management unit 410 may receive information for selecting information on the avatar space, and output an avatar space created such that the avatar of the user account associated with the user terminal is placed in the street-view image. For example, the created avatar space may be provided to the user terminal through a network. The information on the avatar space may refer to information on the avatar spaces searched by the user with a search word. The information on the searched avatar spaces may be output in the form of a list, and sorted according to a predetermined criterion (e.g., latest order, popularity order, and the like). Alternatively, the information on the avatar space may refer to information on a link associated with the avatar space received from another user account. Additionally or alternatively, the avatar space may refer to an avatar space created based on an indoor view of an image (e.g., a panoramic image that is movable within 360 degrees) obtained by capturing indoor images of a specific store.

The avatar space management unit 410 may create a plurality of avatar spaces for one place and/or event. Each of the plurality of avatar spaces may refer to an independent avatar space. For example, an avatar space may be created based on a street-view of a 360-degree movable image obtained by capturing images of the surroundings of "Gwanghwamun Square". A plurality of target avatar spaces associated with "Gwanghwamun Square" may be created. A plurality of avatar spaces associated with one place and/or event may be displayed using additional information. The additional information may be associated with at least one of user information or environment information such as time, season, and the like. For example, the plurality of "Gwanghwamun Square" avatar spaces may be displayed in association with user information such as "Gwanghwamun Square—Students", and "Gwanghwamun Square—30s", and also in association with environment information such as "Gwanghwamun Square—Spring", and "Gwanghwamun Square—Night".

The avatar space management unit 410 may place the avatar of the user account in a predetermined area in the street-view image of the avatar space. The predetermined area may refer to an area within the street-view image of the avatar space, which is recognized as a ground on which the avatar may be placed to stand. Additionally or alternatively, the avatar space management unit 410 may receive information for selecting a movement-related indication included in the street-view image of the avatar space from the user terminal, and change the street-view image in accordance with the changed map information (e.g., coordinate information or address information) to create an avatar space. The positions of the background screen and other avatars may be changed, while the avatar of the user account is maintained in a predetermined area in each of the street-view image before the change and the street-view image after the change.

The avatar may be moved while being placed in a predetermined area in the avatar space. The movement-related indication included in the street-view image may include a line indicating the ground and/or a symbol (e.g., arrow) indicating a movement direction in the street-view image. For example, the avatar space management unit 410 may receive, from the user terminal, information for selecting an arrow indicating any one of the upper or lower, and/or left or right moving directions, and change to the street-view image indicating the address corresponding to the selected direction, to output an avatar space in which the corresponding avatar is placed in the changed street-view image.

The avatar management unit 430 may output information on one or more other avatars placed in the avatar space. For example, this information on avatar may be received from the avatar management unit 430. To this end, the avatar management unit 430 may receive, from the user terminal, information for selecting an avatar for which it is desired to output the information on avatar. If an avatar is selected, the avatar management unit 430 may perform visual processing (e.g., displaying an arrow, highlighting an outline, and the like) for the selected avatar to distinguish it from other avatars.

The avatar space management unit 410 may receive the information on avatar from the avatar management unit 430 and create or change the avatar space using the information. For example, the avatar space management unit 410 may receive one or more avatars and parts (e.g., kimono parts) worn by the one or more avatars, and create or change to an avatar space (e.g., an avatar space associated with Hakodate fireworks) including the avatar to which the received parts are applied. As another example, the avatar space management unit 410 may receive information on one or more gestures for each of one or more avatars, and create or change to an avatar space including the avatar to which the selected gesture is applied, based on the information for selecting one of the one or more gestures. A plurality of gestures may be selected to be applied to the avatar, and the plurality of selected actions may be output for time-series display. For example, a plurality of avatars may be output to perform one or more identical gesture in the same manner in the avatar space.

The avatar space management unit 410 may place items such that the user account may acquire one or more items in the avatar space. Information on the items may be received from the avatar management unit 430. The items may be placed in the avatar space to be identified by a predefined user account. Alternatively, the items may be placed in the avatar space to be identified by all user accounts participating in the avatar space.

The avatar space management unit 410 may receive information for selecting at least one item from among the items obtained from the user terminal, associate at least one selected item with the user account, and output the item to the avatar space. For example, the avatar space management unit 410 may apply the selected item to the avatar to create and output the avatar space. Alternatively, the avatar space management unit 410 may output an avatar space which is created by applying the selected item to the background screen of the avatar space and/or other avatars instead of applying it to the avatar.

The avatar space management unit 410 may create an avatar space including an indoor view of a specific store (e.g., a store or the like that sells clothes, shoes, and the like of a specific brand). The avatar space management unit 410 may place a plurality of products in a specific store and provide a purchase service to the user. For example, the avatar space management unit 410 may receive information for selecting at least one product from among a plurality of products provided by a specific store included in the avatar space, and transmit a purchase request for at least one selected product to a purchase processing system associated with the specific store.

The video management unit 420 may receive a request to receive a video associated with at least one of a place or an event from the user terminal. In addition, the video management unit 420 may receive information for selecting an avatar of the user account associated with the user terminal. Alternatively, the video management unit 420 may receive information on the avatar of the user account associated with the user terminal from the avatar management unit 430. The video management unit 420 may create a video with the avatar of the user account shown thereon. Information on the avatar of the user account may be received from the avatar management unit 430. The video, which is created such that the avatar of the user account is shown, may be provided to the user terminal requesting reception.

The video management unit 420 may output a video with avatars of a plurality of user accounts shown thereon. That is, the avatars of a plurality of user accounts may participate in the video. Information on the avatars of the plurality of user accounts may be received from the avatar management unit 430. For example, the avatars of a plurality of user accounts may be displayed in the video in a sticker format.

The video management unit 420 may receive information on a search word associated with at least one of a place or an event, and search for information on one or more videos based on the search word. The searched information (e.g., a list, and the like) of one or more videos may be provided to the user terminal. If the one or more searched videos are a plurality of videos, the list of the plurality of videos may be arranged in accordance with a predetermined criterion (e.g., latest order, popularity order, and the like) and provided to the user terminal. The video management unit 420 may receive information for selecting one of one or more videos from the user terminal, and provide the selected video to the user terminal. In this case, a video with the avatar associated with the user terminal shown thereon may be provided to the user terminal.

The video management unit 420 may provide one or more avatar items recommended in association with at least one of a place or an event to the user terminal. The list of items may be provided by the avatar management unit 430. The video management unit 420 may receive information for selecting one or more items from the list of items from the user terminal, and provide the user terminal with a video in which the selected item is shown together with the avatar of the user account.

The avatar management unit 430 may register and/or manage information on the avatar, for example, avatars, parts (e.g., clothes, hat, accessories, shoes, belongings, and the like) applicable to the avatars, items, gestures, pre-recorded voice messages or pre-stored text messages registered in the avatar. The avatar and any information associated with the avatar may be provided to the avatar space management unit 410 and/or the video management unit 420.

The avatar management unit 430 may provide one or more randomly recommended candidate avatars for the user account to the avatar space management unit 410 and/or the video management unit 420. The avatar management unit 430 may provide one or more avatar actions (or gestures) previously registered in each of the one or more avatars to the avatar space management unit 410 and/or the video management unit 420.

The messenger unit 440 may support a real-time chat between user accounts in an avatar space provided via an instant messaging application. The chat may include a chat using texts and/or a chat using voice. The messenger unit 440 may support a chat between at least some user accounts participating in the avatar space. For example, if a user account in the avatar space inputs a text and/or a voice message, the messenger unit 440 may share the input text and/or voice message to the user terminals associated with all user accounts participating in the chat.

The messenger unit 440 may support a real-time chat enables a one-to-one conversation with one of the user accounts in the avatar space provided via the instant messaging application. To this end, the messenger unit 440 may receive, from the user terminal, information for selecting a target avatar with which a one-to-one conversation is desired, and connect to enable a one-to-one conversation with the selected target avatar. The messenger unit 440 may provide the user terminal associated with the user account associated with the selected avatar with a request for approval asking whether or not the user account associated with the selected avatar wants a one-to-one conversation, and provide a separate chat window for the one-to-one conversation only upon approval.

The messenger unit 440 may receive information for selecting any one user account placed in the avatar space from the user terminal, and allow the user terminal to replay the voice message associated with the selected avatar. The information for selecting a user account input from the user may include information for selecting a voice-related indication shown around the avatar.

The messenger unit 440 may output an interface for capturing images of one or more avatars placed in the avatar space. The messenger unit 440 may receive a request to capture an image from the user terminal, create an image and/or video of the avatar placed in the avatar space together with the avatar space, and provide the created image and/or video to the user terminal. The capturing may include capturing an image or capturing a video.

The messenger unit 440 may receive a request to share an avatar space from the user terminal to a specific user account. The request to share may include link information of the avatar space. This link information may be provided to a specific user account, and the specific user account may access the avatar space using the link information. Likewise, the messenger unit 440 may receive a request to share a video from the user terminal to a specific user account. The request to share may include link information of the video. Such link information may be provided to a specific user account, and the specific user account may access the video using the link information.

Figure 5:
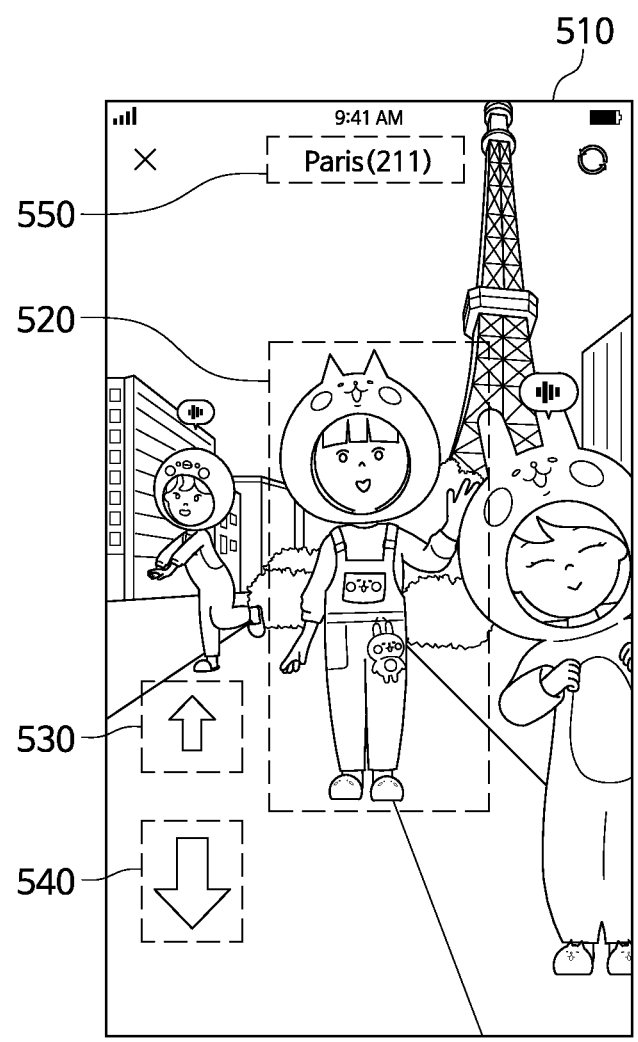
FIG. 5 is a diagram of an example of an avatar space created with an avatar placed in a street-view image according to an embodiment.

FIG. 5 is a diagram of an example of an avatar space 510 created with an avatar 520 placed in a street-view image according to an embodiment. In response to a request to provide an avatar space associated with a specific place or event of the user terminal, the user terminal may output the created avatar space 510 such that the avatar 520 of the user account associated with the user terminal is placed in the street-view image associated with the corresponding place or event. For example, the avatar space 510 may refer to an avatar space created as a panoramic image obtained by capturing images of surroundings of the place. As illustrated in FIG. 5, the avatar space 510 may refer to a virtual space in which a plurality of avatars are placed in a panoramic image obtained by capturing images of surroundings of the Eiffel Tower in Paris.

The plurality of avatars including the avatar 520 may be placed based on the ground in the street-view that forms the avatar space 510, in the avatar space 510. For example, the information processing system may extract a region corresponding to the ground of the street-view from in the image representing the avatar space 510. The avatars may be placed with the feet of each of the avatars positioned in the extracted area.

The avatar 520 may refer to an avatar of a user account associated with the user terminal outputting or displaying the avatar space 510. The avatar 520 may be placed in a predetermined area in the avatar space 510. For example, the predetermined area may be any area in which the feet of the avatar 520 may be placed in the ground near the center if the avatar is viewed in a horizontal direction in the avatar space 510.

The avatar 520 may move to another place in the avatar space 510 by using movement-related indications 530 and 540 in the avatar space 510. For example, while the movement-related indications 530 and 540 are marked by arrows in FIG. 5, aspects are not limited thereto, and may be marked with any type of indication capable of indicating movement. In response to a user input for the arrow 530, a changed avatar space may be output, in which the avatar 520 is now moved a little closer to the displayed Eiffel Tower. The other avatars in the avatar space 510 may be repositioned based on the positions of the other avatars in the avatar space 510 with respect to the changed position of the avatar 520.

The name of the avatar space in the avatar space 510 and the number of participants in the avatar space 510 may be displayed in a specific area 550 of the avatar space 510. For example, the name of the avatar space and the number of participants may be displayed at the top of the avatar space 510, but aspects are not limited thereto, and they may be displayed in any area in the avatar space 510. As illustrated, the name of the avatar space 510 is "Paris", and the number of participants in the avatar space 510 is 211.

Figure 6:
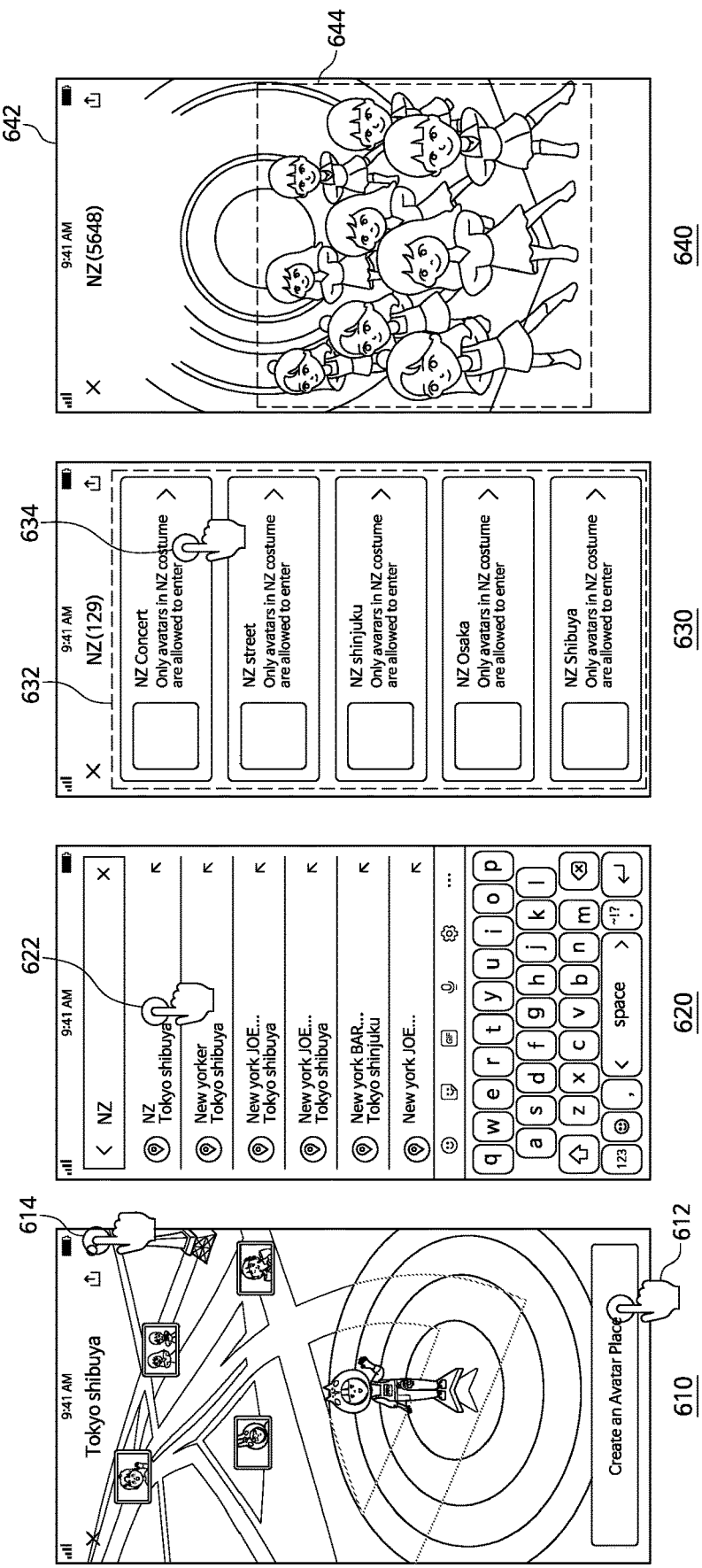
FIG. 6 is a diagram of an example of a process of creating an avatar space or searching a created avatar space according to an embodiment.

FIG. 6 is a diagram of an example of a process of creating an avatar space or searching a created avatar space according to an embodiment. The first to fourth operations 610, 620, 630, and 640 relate to an operation of creating an avatar space, and selecting one of plurality of created avatar spaces and outputting the selected avatar space.

The first operation 610 represents an example in which, with a user input 612, a user requests to create an avatar space. The user terminal may create an avatar space via the instant messaging application, based on the place where the user is currently positioned. For example, as illustrated, the user may perform the user input 612 to create an avatar space while the user's avatar is positioned in a specific place. As another example, the user may output an interface in which a place searched for by a search word is displayed, and an avatar space for the searched place may be created.

The second operation 620 represents an example in which the user inputs a search word and selects, with a user input 622, one from a list of searched places. For example, the user may input building name, place name, address, business name, event (e.g., concert) name, festival name, and the like as a search word. The user may perform the user input 622 to select one from a list of places associated with the inputted search word.

The third operation 630 represents an example in which a list 632 of avatar spaces including a plurality of avatar spaces associated with the place is output by the user, and a user input 634 to select one of the plurality of avatar spaces output from the user is received. For example, as illustrated, an avatar space associated with a "NZ concert" may be selected. Accordingly, as illustrated in the fourth operation 640, the avatar space associated with the "NZ concert" may be output, in which the avatar of the user account associated with the user terminal is placed.

In the fourth operation 640, a plurality of avatars may be output to perform one or more gestures identically. To this end, a user input to select a gesture of the avatar may be received such that the avatar of the user account associated with the user terminal is applied with the same gesture as the avatar of the other user accounts. Alternatively, the avatar of the user account may be set to automatically perform the same gesture as the gesture performed by at least some avatars at the "NZ concert" upon entering the "NZ concert". As described above, as the plurality of avatars perform the same gesture, a flash mob may be implemented in the avatar space. In the fourth operation 640 of FIG. 6, a plurality of avatars 644 are displayed, but aspects are not limited thereto, and one avatar associated with the user account may be displayed. In addition, in the fourth operation 640 of FIG. 6, an avatar space 642 created based on the road view image obtained by capturing indoor images is displayed, but aspects are not limited thereto, and the avatar space created based on the road view image obtained by capturing outdoor images may be displayed.

Figure 7:
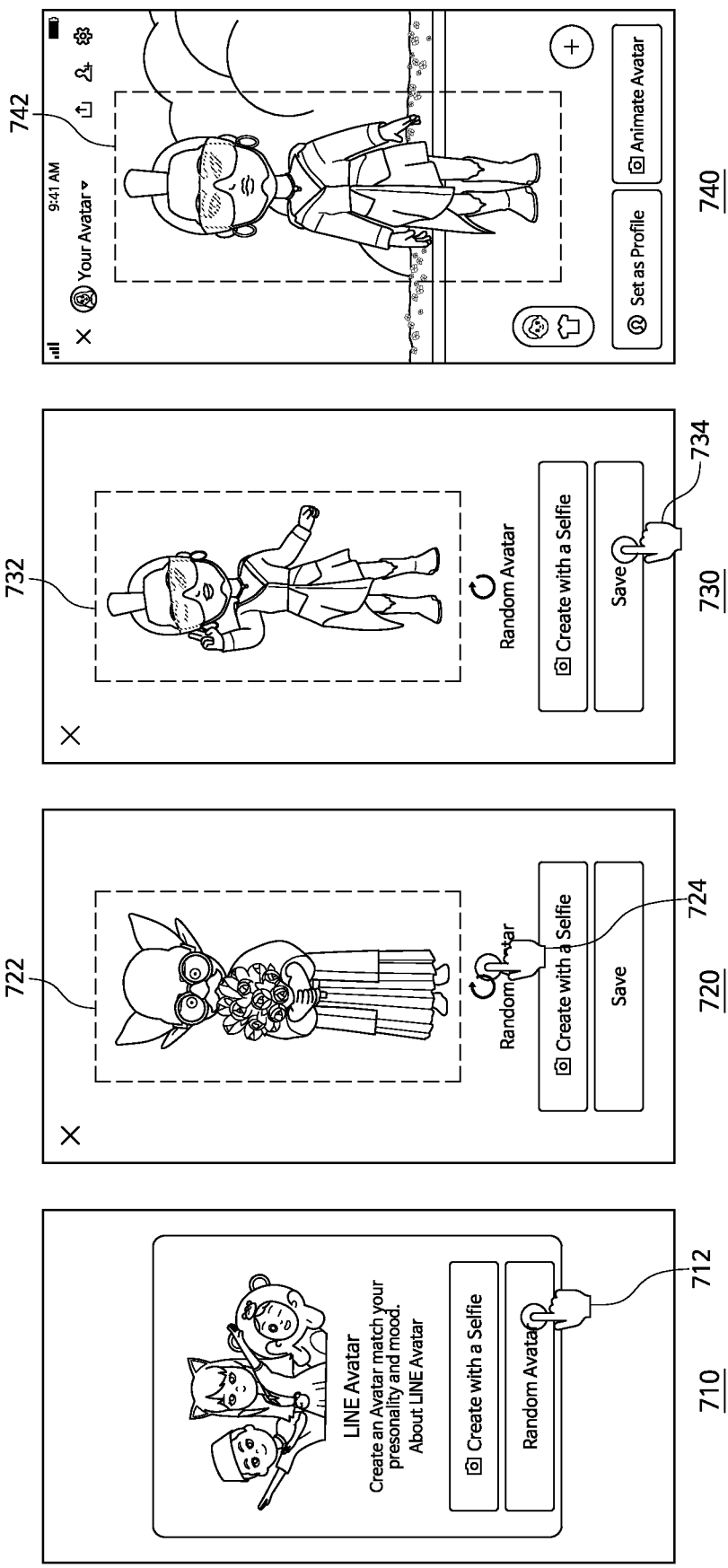
FIG. 7 is a diagram of an example of randomly determining an avatar of a user account according to an embodiment.

FIG. 7 is a diagram of an example of randomly determining an avatar of a user account according to an embodiment. As illustrated, the processor of the user terminal may randomly create an avatar associated with the user account through first to fourth operations 710, 720, 730, and 740. If the randomly created avatar is selected, the selected avatar may be provided in the avatar space.

The first operation 710 represents an example in which, with a user input 712, the user requests to create a random avatar. As illustrated in the first operation 710, the user may be provided with a user interface where it is possible to request to create a random avatar. In the provided user interface, the user may perform the user input 712 to randomly create an avatar associated with the user account.

The second operation 720 represents an example of an avatar 722 randomly created in response to the user input, and an example in which the user requests to create a random avatar again, with a user input 724. In the first operation 710, the random avatar 722 may be created in response to the user input 712. The user may want to select another random avatar and may thus perform the user input 724 to request to create a random avatar again. In another example, the user may not create another random avatar again and instead perform a user input (e.g., a user input of clicking the "save" button illustrated in the second operation) to determine the created random avatar as an avatar associated with the user account. The random avatar 722 may be created in association with a previously selected avatar space. For example, if "Paris" is selected as the avatar space, a random avatar may be created in consideration of appearances of the avatar popular among the users in Paris for a predetermined period of time.

The third operation 730 represents an avatar 732 randomly created again in response to the user input, and an example of determining the random avatar created with a user input 734. Specifically, in the second operation 720, the random avatar 732 may be created again in response to the user input 724. Through the user input 734 to determine the random avatar, which is created again, as the avatar associated with the user account, the created random avatar may be determined as the avatar of the user account.

The fourth operation 740 represents an example in which an avatar 742 associated with the user account, which is determined in response to the user input, is placed in the avatar space. The randomly determined avatar 742 associated with the user account may be placed in a street-view image associated with the place or event and output to the user terminal.

Figure 8:
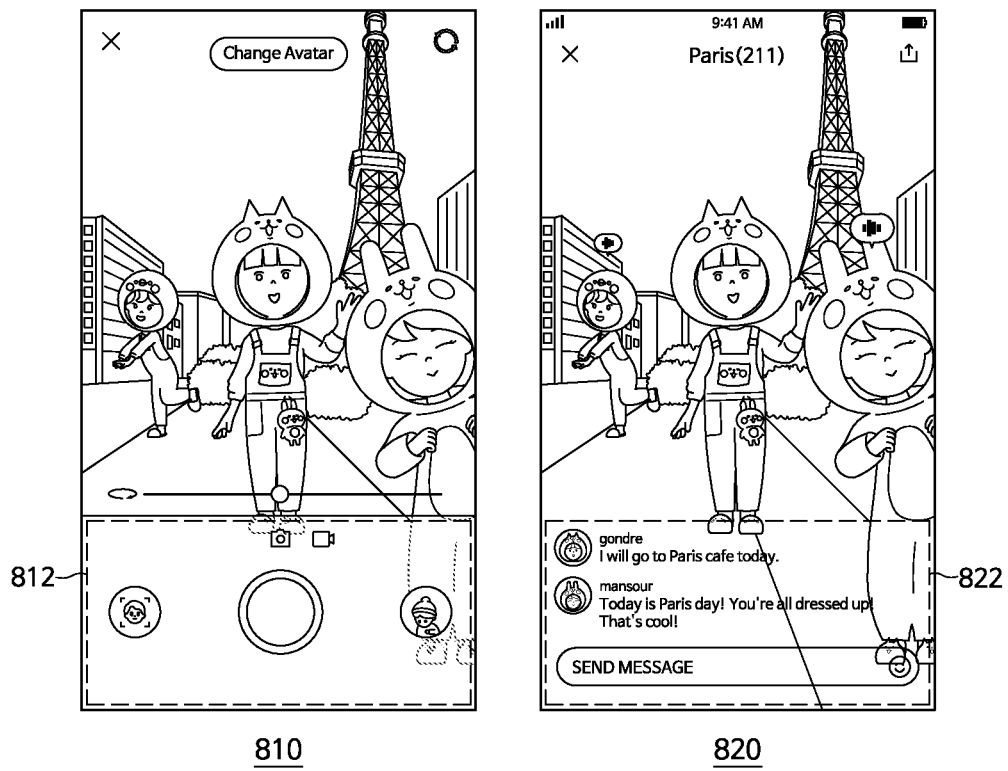
FIG. 8 is a diagram of an example of operations that may be performed among a plurality of avatars placed in an avatar space according to an embodiment.

FIG. 8 is a diagram of an example of the operations that may be performed among a plurality of avatars placed in the avatar space according to an embodiment. A first operation 810 may include a capturing interface 812 for capturing images of at least some of the plurality of avatars placed in the avatar space. A second operation 820 may include a chat interface 822 for performing chats among the plurality of avatars placed in the avatar space.

The first operation 810 represents an example of capturing an image of the avatar of the user account placed in the avatar space, through the capturing interface 812 of the camera application installed in the user terminal. The user may perform a user input to start the capturing interface 812 to capture images, and in response, the user terminal may capture the image of the avatar space created with the avatar in association with the user account being placed therein. The capturing may herein refer to capturing an image or capturing a video. In addition, the captured image or video may include avatars associated with other user accounts as well as the avatar of the user account associated with the user terminal which is placed in the avatar space.

The second operation 820 represents an example of performing a chat among a plurality of user accounts placed in the avatar space, through the chat interface 822 of the instant messaging application installed in the user terminals. The user may use the chat interface 822 to communicate with the avatars of a plurality of other user accounts participating in the avatar space. According to another example, the user may use the chat interface 822 to communicate with the avatar of another user account participating in the avatar space on a one-to-one basis. While FIG. 8 illustrates that the chat interface 822 is formed such that that the latest text input by the user account is output at the bottom of the display, and with the addition of the new texts, the existing texts are moved to the top of the display and eventually disappear, aspects are not limited thereto, and any chat interface may be applied. For example, a plurality of avatars placed in the avatar space may output text in the form of a speech bubble around each of the plurality of avatars to exchange messages with each other.

Figure 9:
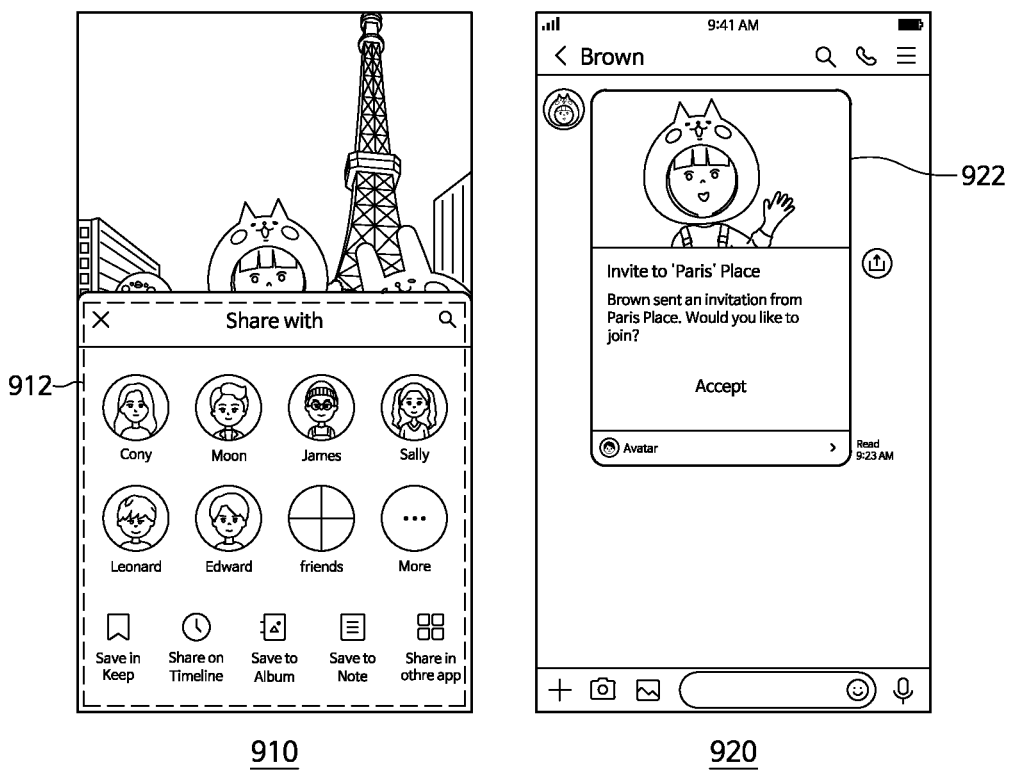
FIG. 9 is a diagram of an example of requesting to share an avatar space, to a user account of another user terminal according to an embodiment.

FIG. 9 is a diagram of an example of requesting to share an avatar space, to a user account of another user terminal according to an embodiment. As illustrated, the user may request to share the avatar space created with the avatar associated with the user account placed therein, through a first operation 910 and a second operation 920.

The first operation 910 illustrates an example of displaying one or more user accounts that may share the avatar space through a sharing interface 912 of the instant messaging application installed in the user terminal. For example, the sharing interface 912 may display contacts stored in the user terminal or user accounts registered as a "friend" in the instant messaging application. The user may perform a user input to select one of the user accounts displayed on the sharing interface 912.

The second operation 920 represents an example of displaying a message 922 including link information associated with the avatar space, which is transmitted to the selected user account in response to the user input. For example, if the message 922 including link information associated with the avatar space is transmitted to a user account registered as "friend" in the instant messaging application, the message 922 may be provided through a chat room of the instant messaging application. In another example, the message 922 may be sent as a text message to the corresponding user.

Figure 10:
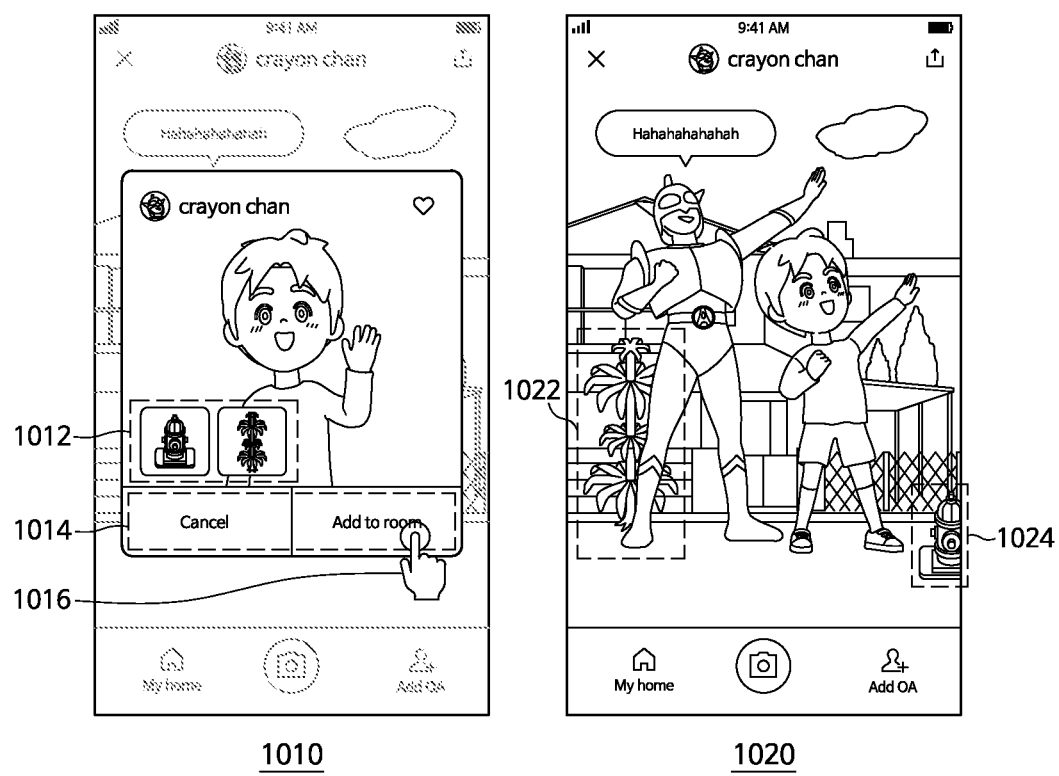
FIG. 10 is a diagram of an example of an avatar space with an acquired avatar placed therein according to an embodiment.

FIG. 10 is a diagram of an example of an avatar space with an acquired item placed therein according to an embodiment. As illustrated in a first operation 1010 and a second operation 1020, the user may place at least one of one or more acquired items 1012 in the avatar space. The item may be obtained by the user purchasing the corresponding item, or may be obtained by selecting an item placed in the avatar space.

In the first operation 1010, a list 1012 of items acquired by the user account in the avatar space that the user account is participating in, a message 1014 displayed, and a user input 1016 to place the acquired items in the avatar space may be displayed. The user may perform the user input 1016 to place at least one of the acquired items 1012 in the avatar space that the user account is participating in. For example, a list of items obtainable in the avatar space 1012 may be displayed in the form of the message 1014. As another example, the items obtainable in the avatar space may be displayed such that the type of the item may be identified. In still another example, the items obtainable in the avatar space may be displayed anonymously such that the type of the item cannot be identified. The type of an item obtainable with a user input may be displayed so as to be identified.

The second operation 1020 represents an example in which items 1022 and 1024 placed by the user with a user input are displayed in the avatar space that the user account is participating in. For example, one or more items 1022 and 1024 applied with the user input may be placed in the avatar space. In response to a user input to change the position of the avatar in the avatar space, the relative position of the item for the avatar in the avatar space may be changed.

Figure 11:
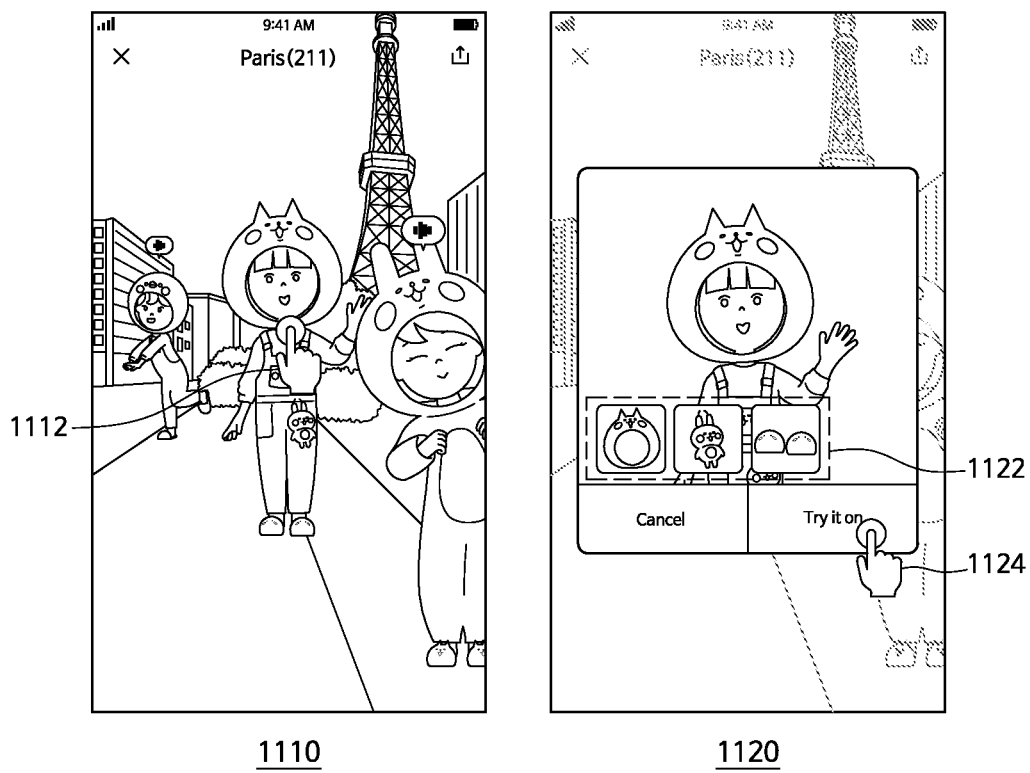
FIG. 11 illustrates an example of selecting an avatar placed in the avatar space to display parts that the avatar may wear.

FIG. 11 is a diagram of an example of selecting an avatar placed in the avatar space to display parts that the avatar may wear according to an embodiment. As illustrated, through a first operation 1110 and a second operation 1120, the user may select an avatar placed in the avatar space and check the parts the selected avatar is wearing.

The user may select one of a plurality of avatars included in the avatar space to check the parts belonging to the selected avatar. As illustrated in the first operation 1110, with a user input 1112, the user may select his/her own avatar placed in the avatar space. Alternatively, it is possible to select the avatar of the other user account in the avatar space to check the parts belonging to the avatar of the other user account.

If the user selects his/her own avatar in the avatar space, a user interface as the one illustrated in the second operation 1120 may be displayed. In response to selection the user's own avatar, a list 1122 of parts the user's own avatar is wearing may be displayed. A user input 1124 may be received, which is to apply a part selected by the user input from the displayed list of parts to the user's own avatar. In the second operation 1120 of FIG. 11, the list 1122 of parts is displayed as the list 1122 of parts the avatar is currently wearing, but aspects are not limited thereto. The list 1122 of parts may include a list of parts that the selected avatar may wear.

Figure 12:
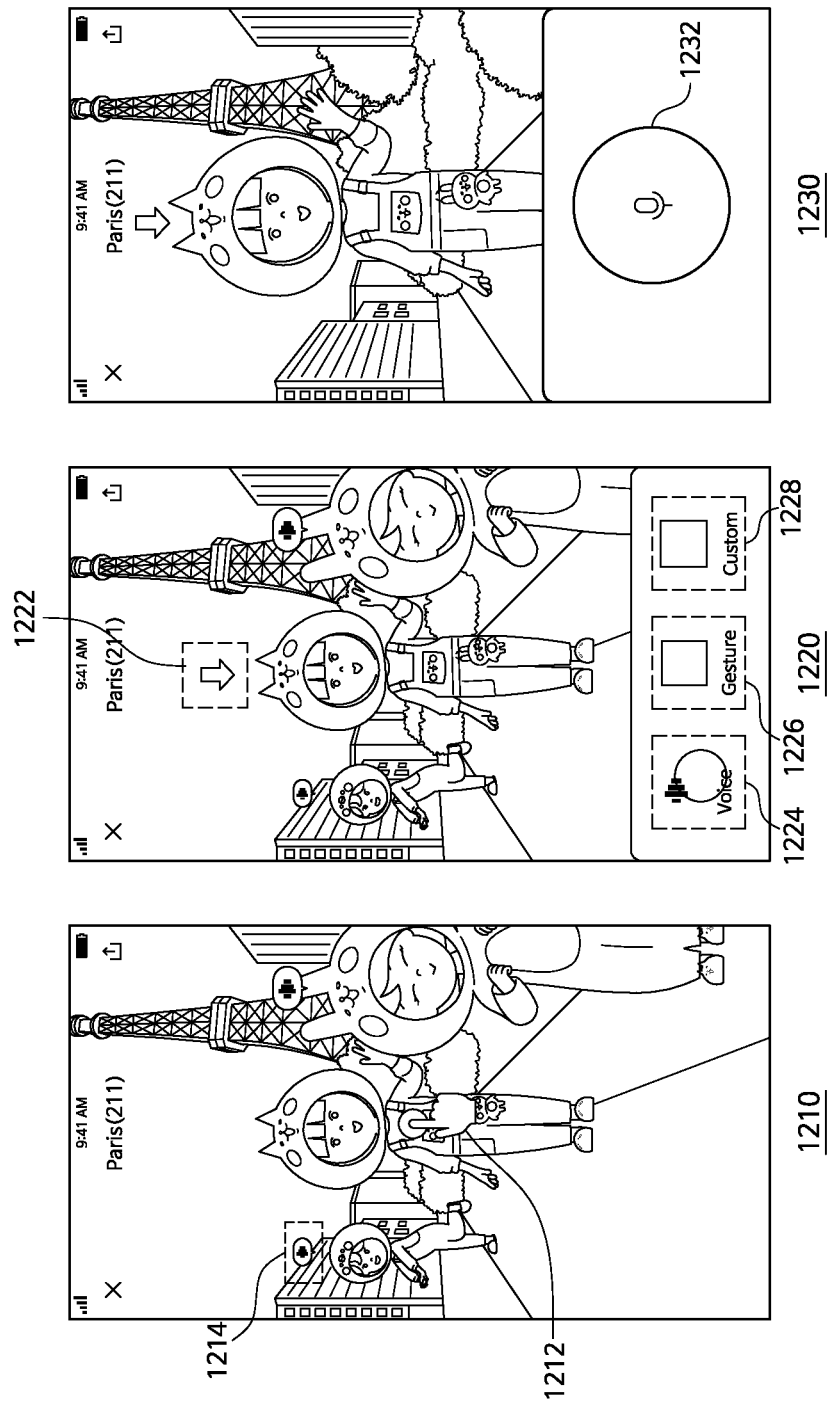
FIG. 12 is a diagram of an example of selecting an avatar placed in an avatar space and controlling the selected avatar according to an embodiment.

FIG. 12 is a diagram of an example of selecting the avatar placed in the avatar space and controlling the selected avatar according to an embodiment. As illustrated, the user may perform a control operation on his/her own avatar through first to third operations 1210, 1220, and 1230. Alternatively, if the user selects an avatar of another user account, the user may check voices, gestures, and parts associated with the corresponding avatar.

The first operation 1210 represents an example in which, with a user input 1212, the user selects his/her own avatar placed in the avatar space. FIG. 12 illustrates an example in which the user selects his/her own avatar, but aspects are not limited thereto, and any of the two other avatars also placed in the avatar space may be selected.

If the avatar is selected with the user input, the selected user's own avatar may be displayed 1222 distinguishably from other avatars. In the second operation 1220 and the third operation 1230, it is illustrated that the arrow indication 1222 is pointing to the selected avatar, but aspects are not limited thereto, and any indication method that may distinguish the selected avatar from the other avatars may be applied. In another example, if an avatar of another user account rather than the user's own avatar is selected, the avatar of another user account may be displayed distinguishably from the other avatars in the avatar space.

The second operation 1220 represents an example of displaying an interface for controlling the selected user's own avatar in response to a user input. A user input to select a voice message icon 1224 may be performed, such that the voice message of the user's own avatar is replayed. According to another example, the user may perform a user input for a gesture icon 1226 to apply a gesture to the selected avatar and display the result. According to still another example, the user may perform a user input for a "custom" icon 1228 to display parts applicable to the selected avatar. The voice, gesture, and/or parts of the avatar may be stored in association with the avatar in advance.

The third operation 1230 represents an example of displaying an icon 1232 for recording a voice message on the user's own avatar. The user may record a voice message on the avatar of the user account in advance. For example, the user may record one or more voice messages associated with a particular avatar space, and the one or more recorded voice messages may be stored in association with the avatar of the user account.

Figure 13:
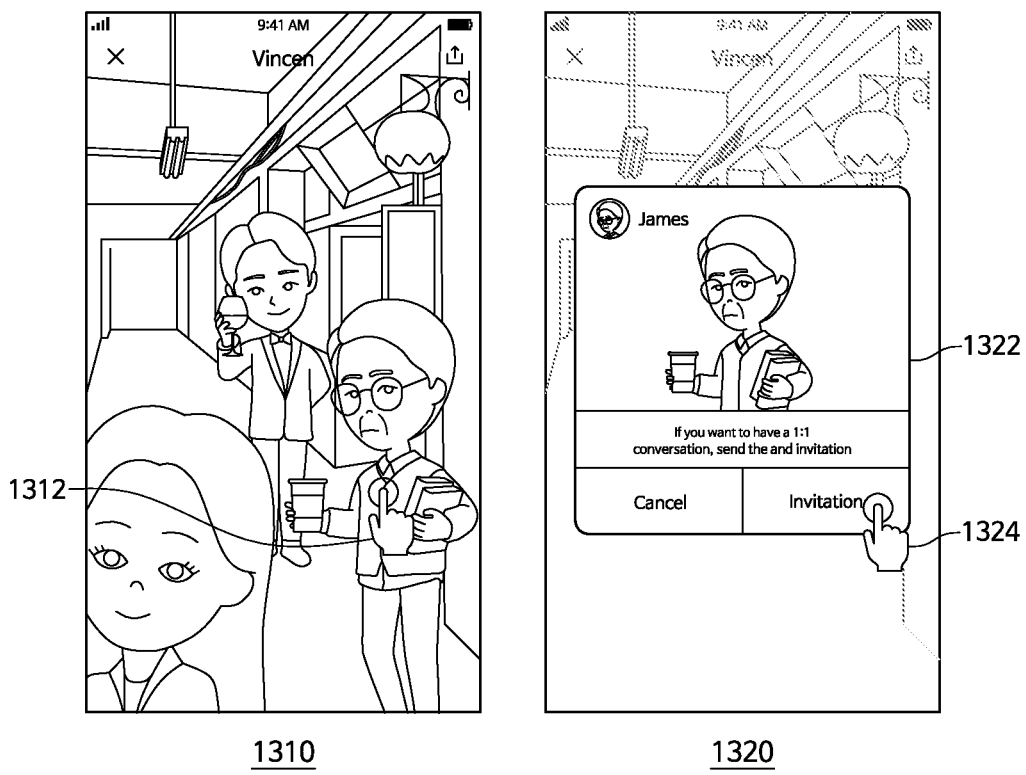
FIG. 13 is a diagram of an example of selecting an avatar placed in an avatar space to have a 1:1 chat with the selected avatar according to an embodiment.

FIG. 13 is a diagram of an example of selecting an avatar placed in the avatar space to have a 1:1 chat with the selected avatar according to an embodiment. As illustrated, through a first operation 1310 and a second operation 1320, the user may select an avatar placed in the avatar space and chat 1:1 with the selected avatar. That is, 1:1 chat with the user associated with the selected avatar may proceed.

The first operation 1310 represents an example in which, with a user input 1312, the user selects an avatar of another user account placed in the avatar space. In the avatar space, avatars of other user accounts may be placed in addition to the avatar of the user account. In this disclosure, avatars of two other user accounts are illustrated in the virtual space. For example, as illustrated, the user input 1312 may be performed, which is to select one avatar (James) from among the avatars of two other user accounts.

The second operation 1320 represents an example in which, in response to the user input, a message 1322 to transmit an invitation message to the user terminal associated with the selected avatar is outputted. A user input 1324 to request to transmit an invitation message to the user terminal associated with the selected avatar may be performed. The 1:1 chat between the user accounts may be initiated, as the user of the user terminal receiving the invitation message responds with a user input to the received invitation message.

Figure 14:
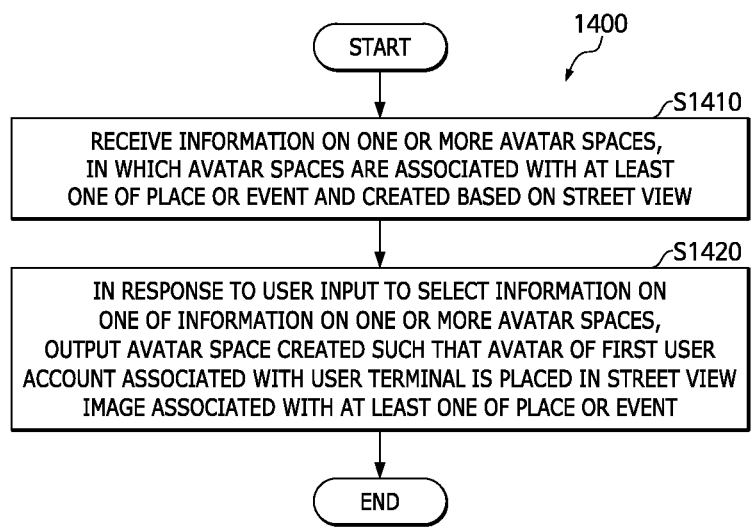
FIG. 14 is a flowchart illustrating a method for providing an avatar space based on a street-view according to an embodiment.

FIG. 14 is a flowchart illustrating a method 1400 for providing an avatar space based on a street-view according to an embodiment. The method 1400 for providing an avatar space based on a street-view may be performed by a processor (e.g., one or more processors of the user terminal). As illustrated, the method 1400 for providing an avatar space based on a street-view may be initiated by the processor receiving information on one or more avatar spaces that are associated with at least one of a place or an event and created based on the street-view, in operation S1410. For example, the information on one or more avatar spaces may refer to a list of one or more avatar spaces searched by the input of the user. As another example, the information on one or more avatar spaces may refer to link information for the avatar spaces shared by other user accounts.

Then, in response to the user input to select information on one of the information on the one or more avatar spaces, the processor may output an avatar space created such that an avatar of a first user account associated with the user terminal is placed in a street-view image associated with at least one of the place or the event, in operation S1420. The outputted avatar space may refer to an avatar space created based on a street-view of a 360-degree movable panoramic image obtained by capturing images of surroundings of a place. In addition, the avatar space may refer to an avatar space created based on an indoor view of a 360-degree movable panoramic image obtained by capturing indoor images of a specific store. The avatar space may be created such that avatars of one or more user accounts are placed in a street-view image associated with the place. For example, the avatar space may be associated with a place such as "Tokyo Olympic Stadium", "Eiffel Tower", or "Gwanghwamun Square", and the spaces around or inside the associated place may be created based on a street-view. Additionally or alternatively, the avatar space may be created such that the avatar of the user account is placed in the street-view image associated with the event. For example, the avatar space may be associated with events such as the "Tokyo Olympics", "Han River Fireworks Festival", "concert", and the like, and spaces around or inside a place associated with the event may be created based on a street-view.

Figure 15:
FIG. 15 is a diagram of an example of a video being output, in which an avatar is placed on the video according to an embodiment.

FIG. 15 is a diagram of an example of an operation 1510 of displaying an output video with an avatar 1520 placed in the video according to an embodiment. As illustrated in the operation 1510, the user terminal may output a video in which the avatar 1520 of the user account associated with the user terminal is displayed in a video associated with at least one of a place or an event. The video may refer to streaming broadcasting or live broadcasting. In addition to the avatar 1520 of the user account, avatars of one or more other user accounts associated with the other user terminals may also be displayed in the video. In the present disclosure, in the output video, two different avatars may be displayed. As illustrated in the operation 1510, the user terminal may overlay the images of the avatars of one or more user accounts including the avatar of the user account as separate objects on the video and output the result. That is, the one or more avatars may be overlaid on the video in a form similar to a sticker form.

Figure 16:
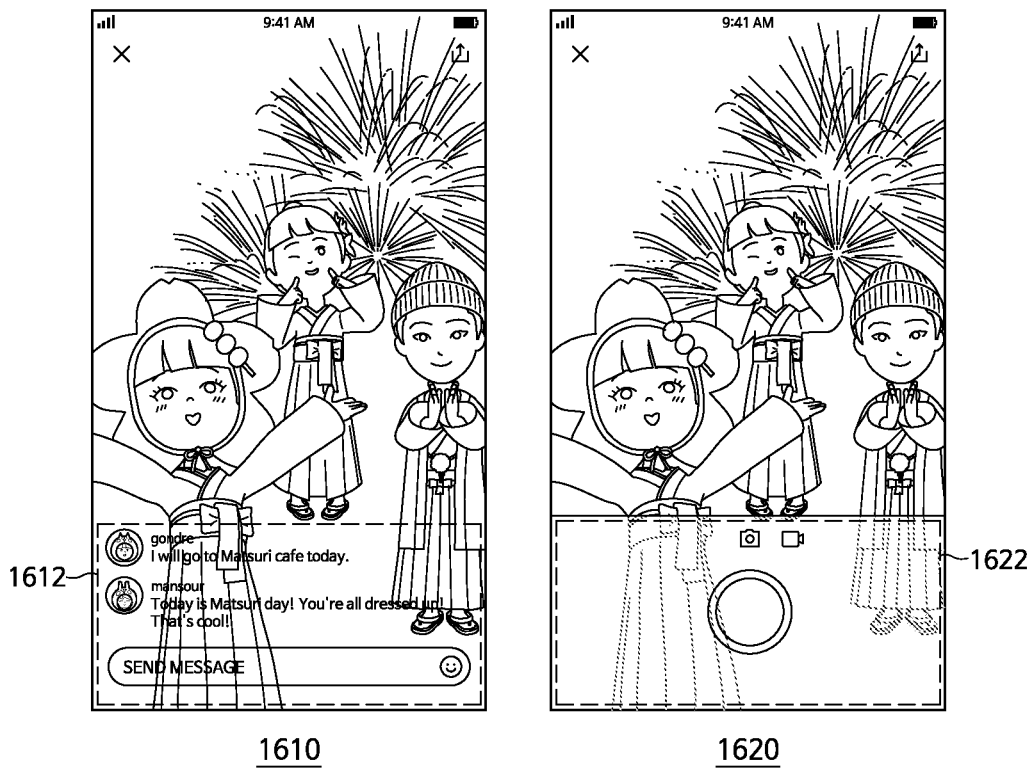
FIG. 16 is a diagram of an example of an operation that may be executed between user accounts placed in a video in which an avatar is displayed according to an embodiment.

FIG. 16 is a diagram of an example of an operation that may be executed between user accounts placed in a video in which an avatar is displayed according to an embodiment. A first operation 1610 may include a chat interface 1612 for performing a chat among a plurality of avatars placed in the video. A producer who provides the video may also chat with the user account associated with the avatar included in the video through the chat interface 1612.

A second operation 1620 may include a capturing interface 1622 for capturing images of at least some of a plurality of avatars placed in the video. The second operation 1620 represents an example of capturing an image of the avatar of the user account displayed in the video through the capturing interface 1622 of the camera application installed in the user terminal. For example, the user may perform a user input to start the capturing interface 1622 to capture images, and in response, the user terminal may record a video in which the avatar associated with the user account is displayed. The capturing may herein refer to capturing an image or capturing a video. In addition, the captured image or video may include avatars associated with other user accounts as well as the avatar of the user account associated with the user terminal which is placed in the avatar space.

The chat interface 1612 illustrated in the first operation 1610 of FIG. 16 is formed such that that the latest text input by the user account is output at the bottom of the display, and with the addition of the new texts, the existing texts are moved to the top of the display and eventually disappear, aspects are not limited thereto, and any chat interface may be applied. For example, a plurality of avatars placed in the avatar space may output text in the form of a speech bubble around each of the plurality of avatars to exchange messages with each other.

Figure 17:
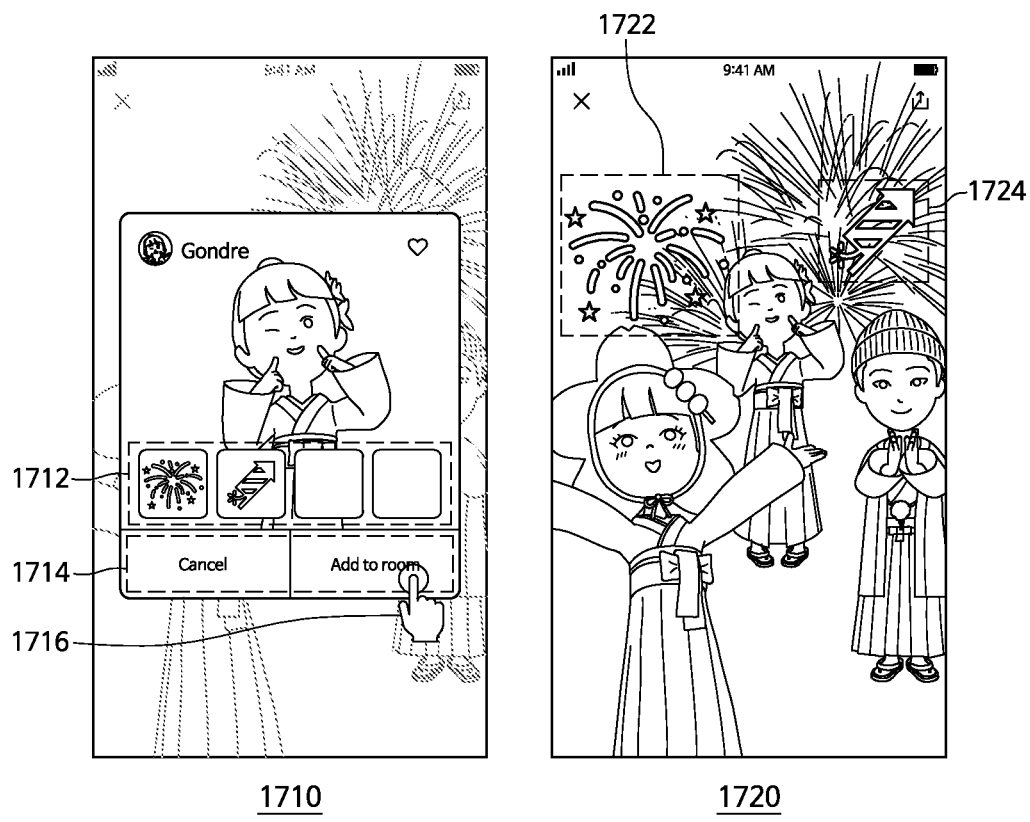
FIG. 17 is a diagram of an example of selecting a recommended item and displaying it on a video together with an avatar according to an embodiment.

FIG. 17 is a diagram of an example of selecting a recommended item and displaying it on the video together with the avatar according to an embodiment. As illustrated, through a first operation 1710 and a second operation 1720, the user may select one or more items from a list 1712 of recommended items, and the user terminal may display the avatar of the user account together with the selected item on the video. The video may refer to a video associated with at least one of a place or an event.

In the first operation 1710, the list 1712 of recommended items, a message 1714 associated with the list 1712, and a user input 1716 to place the selected item in the video are illustrated. The list 1712 may include one or more recommended avatar items associated with at least one of a place or an event. For example, the list 1712 of items may be recommended according to an avatar space associated with the video. For example, if an avatar space of "fireworks" is associated as information on video, items associated with "fireworks" may be recommended in the form of a list to the avatar of the user participating in the video. According to another example, if a specific concert avatar space is associated as the information on video, an item such as a light stick and the like to be used at the concert may be recommended to the avatar of the user participating in the video.

The second operation 1720 represents an example in which an item 1722, 1724 placed by the user input is displayed on the video that the user account is participating in. Specifically, an item selected by the user input may be displayed in the video. In the present disclosure, as illustrated in the second operation 1720, both items associated with two recommended fireworks may be selected and displayed in the output video. While it is described in FIG. 17 that all of the recommended items are selected, aspects are not limited thereto, and part of the recommended items may be selected and displayed in the video. The interface for placing the item 1722, 1724 may be displayed only to a user (creator) associated with the production of a video, or to a user (master user or administrator) granted with certain rights. The placement of the item 1722, 1724 may be collectively displayed to all users participating in the corresponding video.

Figure 18:
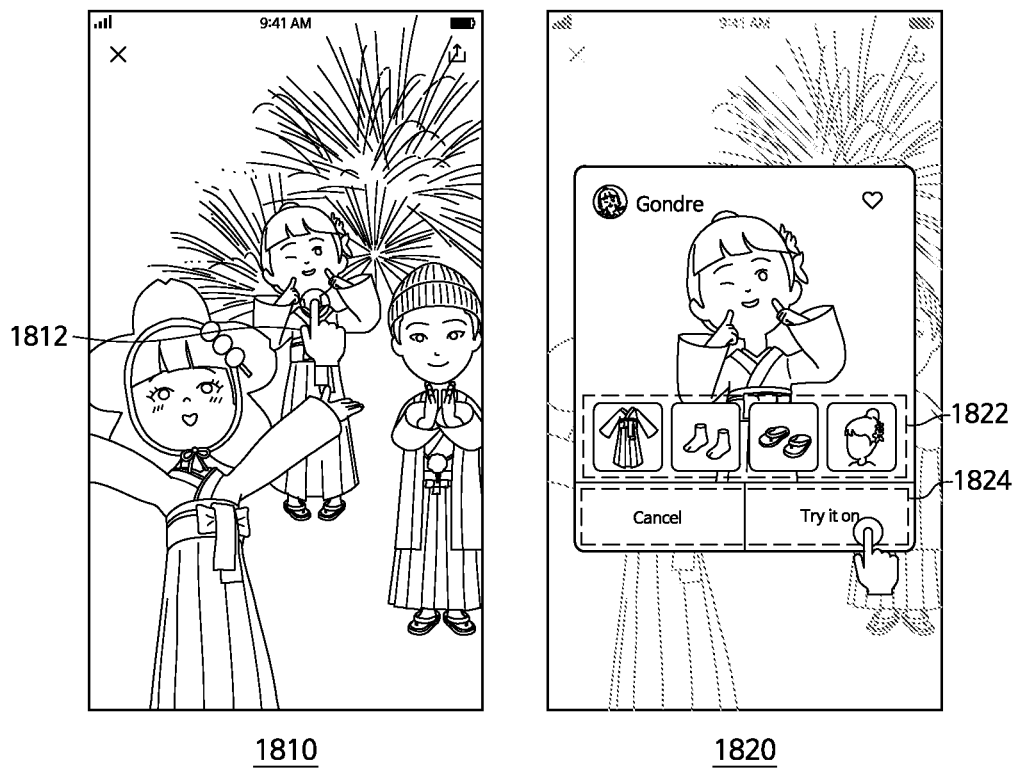
FIG. 18 is a diagram of an example of selecting an avatar displayed in a video and displaying parts that the avatar may wear according to an embodiment.

FIG. 18 is a diagram of an example of selecting an avatar displayed in the video and displaying parts that the avatar may wear according to an embodiment. As illustrated, through a first operation 1810 and a second operation 1820, the user may select an avatar placed in the avatar space and check the parts the selected avatar is wearing.

The user may select one of a plurality of avatars included in the video to check the parts belonging to the selected avatar. As illustrated in the first operation 1810, with a user input 1812, the user may select his/her own avatar placed in the video. Alternatively, it is possible to select the avatar of the other user account in the video to check the parts belonging to the avatar of the other user account.

If the user selects his/her own avatar in the video, a user interface as the one illustrated in the second operation 1820 may be displayed. In response to selection the user's own avatar, a list 1822 of parts the user's own avatar is wearing may be displayed. A user input 1824 may be received, which is to apply a part selected by the user input from the displayed list of parts to the user's own avatar. In the second operation 1820 of FIG. 18, the list 1822 of parts is displayed as the list 1822 of parts the avatar is currently wearing, but aspects are not limited thereto. The list 1822 of parts may include a list of parts that the selected avatar may wear. Although not illustrated, the list of parts 1822 may be recommended according to an avatar space associated with the video. For example, if the avatar space "fireworks" is associated as the information on video, parts (Japanese traditional clothes) associated with "fireworks" may be recommended in the form of a list to the avatar of the user participating in the video. According to another example, if a specific concert avatar space is associated as the information on video, parts (fan club clothes) associated with the specific concert may be recommended to the avatar of the user participating in the video.

Figure 19:
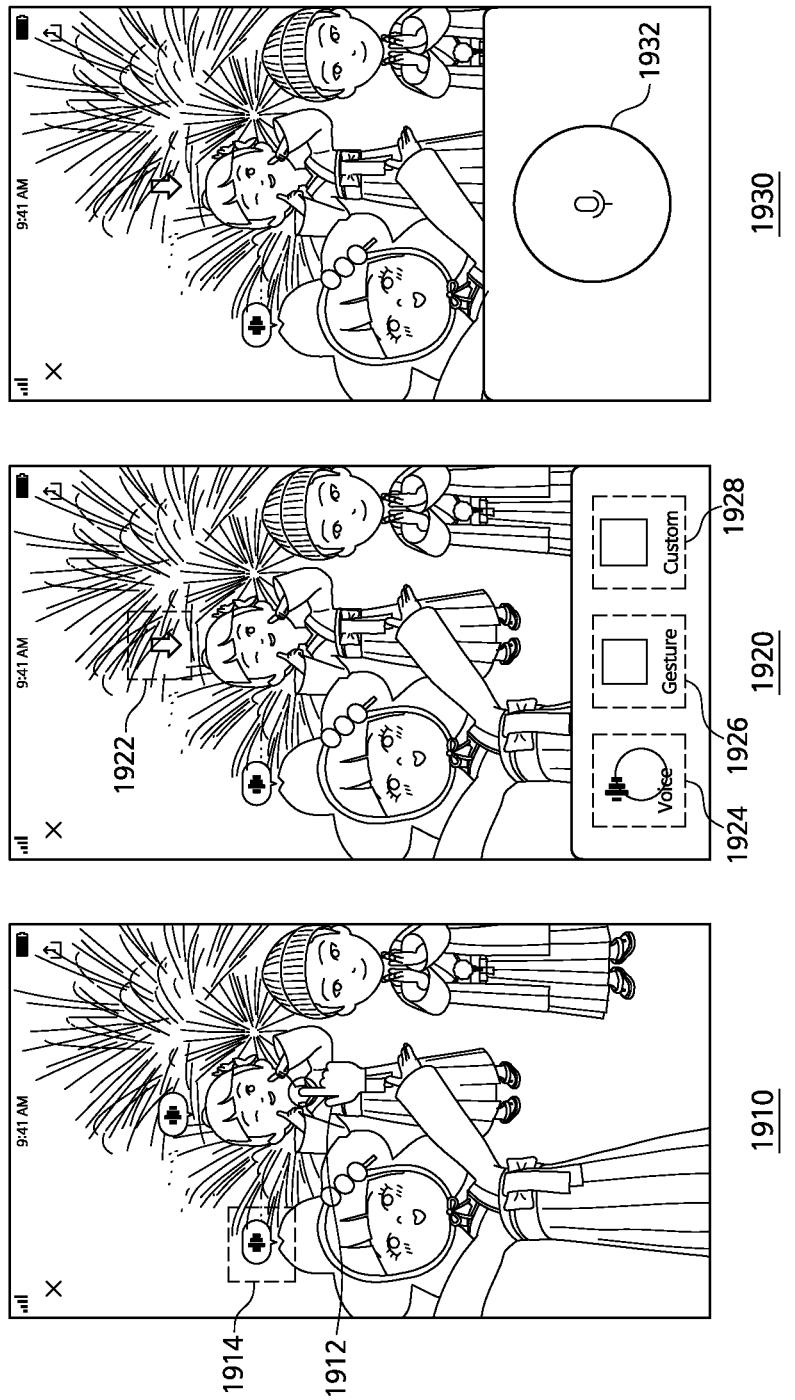
FIG. 19 is a diagram of an example of selecting an avatar displayed in a video and controlling the selected avatar according to an embodiment.

FIG. 19 is a diagram of an example of selecting an avatar displayed in the video and controlling the selected avatar according to an embodiment. As illustrated, the user may perform a control operation on his/her own avatar through first to third operations 1910, 1920, and 1930. Alternatively, if the user selects an avatar of another user account, the user may check voices, gestures, and parts associated with the corresponding avatar.

If a voice message is stored in association with at least one of the user's own avatar and the avatar of another account, a voice-related indication may be output around the at least one avatar. As illustrated in the first operation 1910, a voice-related indication 1914 may be output above the avatar on the left, which is the avatar of another account. In the present disclosure, if the voice message is also stored for the user's own avatar, as illustrated in the first operation 1910, the voice-related indication may also be output above the user's own avatar. In the present disclosure, it is illustrated that the voice-related indication is output above the avatar, but aspects are not limited thereto, and the voice-related indication may be output at any position around the avatar.

The first operation 1910 represents an example in which the user selects one avatar placed in the video with a user input 1912. FIG. 19 illustrates an example in which the user selects one avatar, but aspects are not limited thereto, and a plurality of avatars placed in the avatar space may be selected.

If the avatar is selected by the user input, the selected user's own avatar may be displayed 1922 differently to be distinguished from other avatars. In the second operation 1920 and the third operation 1930, it is illustrated that the arrow indication 1922 is pointing to the selected avatar, but aspects are not limited thereto, and any indication method that may distinguish the selected avatar from the other avatars may be applied. In another example, if an avatar of another user account rather than the user's own avatar is selected, the avatar of another user account may be displayed distinguishably from the other avatars in the avatar space.

The second operation 1920 represents an example of displaying an interface for controlling the selected user's own avatar in response to a user input. The voice, gesture, and/or parts of the avatar may be stored in association with the avatar in advance.

The video with a message from the selected avatar displayed thereon may be output. Such a message may be output only if such is allowed by the producer of the video. A user input to select a voice message icon 1924 may be performed, such that the voice message of the user's own avatar is replayed. The voice message thus selected may be output in the video. According to another example, if the message is text, the message may be output as text around at least one avatar. For example, text included in the speech bubble may be output around the avatar in the video.

The user may perform a user input for a gesture icon 1926 to apply a gesture to the selected avatar and display the result. For example, the user terminal may output a plurality of candidate gestures associated with the avatar of the user account. A user input to select one of the plurality of outputted candidate gestures may be received. A video displaying the avatar of the user account applied with the one selected gesture may be displayed.

The video may include a video (e.g., live broadcasting, streaming broadcasting) transmitted in real time. If the one selected gesture is a predetermined gesture (e.g., a gesture of waving a hand, and the like), the avatar of the user account may be allowed to participate in the video transmitted in real time. For example, in the video being output, the avatar of the user account may respond to a question received from the producer of the video. As another example, the avatar of the user account may make a specific gesture (e.g., high-five, and the like) along with a person or avatar participating in the video.

According to still another example, the user may perform a user input for a "custom" icon 1928 to display parts applicable to the selected avatar. If parts different from the parts of the currently output avatar are selected, the changed parts may be applied to the avatar displayed in the output video.

The third operation 1930 represents an example of displaying an icon 1932 for recording a voice message on the user's own avatar. The user may record a voice message on the avatar of the user account in advance. The user may record one or more voice messages, and the one or more recorded voice messages may be stored in association with the avatar of the user account. For example, the stored voice messages may be configured to be output from the avatar of the user account if such is allowed by the producer of the video. The avatar of the user account may be output distinguishably from other avatars.

While FIG. 19 illustrates the operation of selecting the user's own avatar and controlling the selected user's own avatar, aspects are not limited thereto, and one of one or more avatars of other accounts may be selected. If an avatar of another account is selected, it may be output differently from the other unselected avatars. Additionally or alternatively, if an avatar of another account is selected, a video outputting a message from the selected avatar of another account may be output. If the message is stored as a text message, the text message may be output around the selected avatar of another account. Alternatively, if the message is stored as a voice message, a voice-related indication may be output around at least one avatar. If the voice-related indication is selected, the stored voice message may be output.

Figure 20:
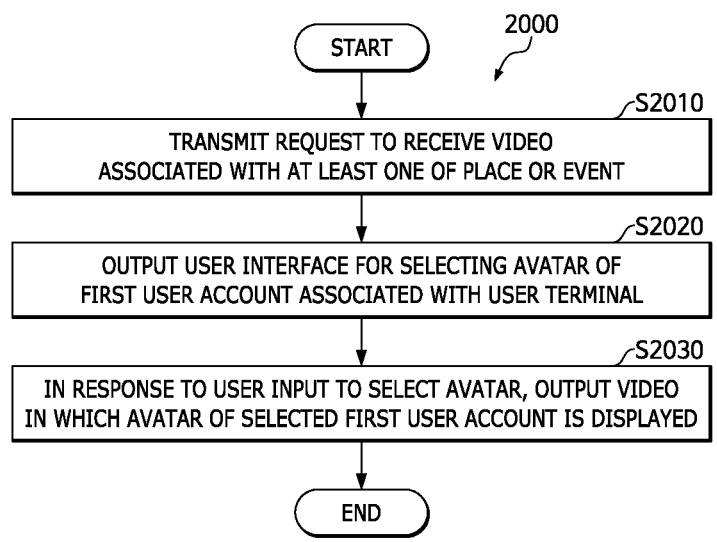
FIG. 20 is a flowchart illustrating a method for providing a video using an avatar according to an embodiment.

FIG. 20 is a flowchart illustrating a method 2000 for providing a video using an avatar according to an embodiment. The method 2000 for providing a video using an avatar may be performed by a processor (e.g., one or more processors of the user terminal). As illustrated, the method 2000 for providing a video using an avatar may be initiated by the processor transmitting a request to receive a video associated with at least one of a place or an event, in operation S2010. The method 2000 for providing a video using an avatar may be initiated by the processor receiving information on a search word associated with at least one of a place or an event. The processor may receive the information on one or more of the plurality of videos which are searched based on the search word. In response to a user input to select one of the one or more videos, the processor may transmit a request to receive the video. According to another example, before transmitting the request to receive the video associated with the event, the processor may transmit a request for ticket purchase to receive the video. If a ticket purchase is done, the request to receive the video may be transmitted. For example, the video associated with the event may include a live video broadcasting a concert. The user may request for ticket purchase so as to purchase a ticket to participate in the concert video, and if the purchase of the ticket is confirmed, the user may receive the video.

The processor may output a user interface for selecting the avatar of the first user account associated with the user terminal, in operation S2020. The processor may output one or more avatar items recommended in association with at least one of a place or an event. The processor may receive a user input to select one of the one or more output avatar items. The one or more recommended avatar items may include parts such as clothes and the like applicable to the avatar. Additionally or alternatively, the recommended avatar items may include an item (e.g., a light stick in a concert broadcast, and the like) that may be used while participating in a streaming broadcast/live broadcast, and the like.

In response to a user input to select an avatar, the processor may output a video in which the avatar of the selected first user account is displayed, in operation S2030. That is, a video may be output, in which the selected avatar of the first user account is displayed on the video requested to be received, at S2010. In response to a user input to select a recommended item, the processor may output a video in which the selected one avatar item and the avatar of the first user account are displayed together. The video may include a video transmitted in real time. The video may refer to streaming broadcasting or live broadcasting. For example, if the output video is a live broadcast associated with shopping content, the avatar of the user account may be output together with an image of a product or service associated with sales information.

The processor may output a video displaying avatars of one or more second user accounts. For example, a plurality of avatars may be displayed in the video. The plurality of avatars may include avatars of user accounts associated with different user terminals, respectively. The plurality of avatars displayed in the video may be displayed in the video in the form of stickers.

The user terminal may transmit a request to share link information of the output video, to a third user account associated with the first user account. The third user account may be a friend, a follower, or a following account of the first user account, for example. To this end, the user terminal may provide such a request to share to the information processing system, and the information processing system may provide the request to share to the user terminal of the third user account. The request to share may include link information of the video.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as RAM, ROM, NVRAM, PROM, EPROM, EEPROM, flash memory, CD) magnetic or optical data storage devices, and the like. The instructions may be executable by one or more processors, and may cause the processor(s) to perform certain aspects of the functions described in the present disclosure.

If implemented in software, the techniques may be stored on a computer-readable medium as one or more instructions or codes, or may be transmitted through a computer-readable medium. The computer-readable media include both the computer storage media and the communication media including any medium that facilitates the transmission of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that may be used to transmit or store desired program code in the form of instructions or data structures and may be accessed by a computer. In addition, any connection is properly referred to as a computer-readable medium.

For example, if the software is transmitted from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes may be made without departing from the scope of the present disclosure, which may be understood by those skilled in the art to which the present disclosure pertains. In addition, such modifications and changes should be considered within the scope of the claims appended herein.

What is claimed is:

1. A method comprising:
   receiving information on one or more avatar spaces, wherein the one or more avatar spaces are associated with at least one of a place and an event, wherein the one or more avatar spaces are created based on a 360-degree view, and wherein the 360-degree view is a pre-stored street-view obtained by capturing images of surroundings of a real place; and
   in response to a user input selecting the information on the one or more avatar spaces, outputting a first avatar space that is created such that an avatar of a first user account associated with a user terminal is placed in a 360-degree view image associated with at least one of the place and the event,
   wherein the avatar of the first user account is placed in a predetermined area in the 360-degree view image, and
   wherein the method further comprises:
      in response to a user input selecting a movement-related arrow indication in the 360-degree view image in the first avatar space, outputting a second avatar space in which map information of the 360-degree view image is changed while the avatar of the first user account remains placed in the predetermined area;
      prior to outputting the first avatar space, receiving candidate parts to be applied to the avatar of the first user account, wherein the candidate parts are associated with at least one of the first avatar space and a current viewpoint; and
      in response to a user input selecting one of the received candidate parts, outputting a third avatar space comprising an avatar applied with the selected one of the received candidate parts.

2. The method of claim 1, further comprising creating a target avatar space associated with at least one of a target place and a target event,
   wherein the created target avatar space comprises an avatar space searchable by a search word associated with at least one of the target place and the target event.

3. The method of claim 1, further comprising transmitting a request to share link information of the first avatar space to a second user account associated with the first user account.

4. The method of claim 1, further comprising:
   prior to outputting the first avatar space, receiving one or more candidate avatars randomly recommended for the first user account; and
   receiving a user input selecting one of the received one or more candidate avatars as the avatar of the first user account.

5. The method of claim 1, wherein the first avatar space comprises avatars of one or more third user accounts placed in the 360-degree view image, and
   wherein the first user account is different from the one or more third user accounts.

6. The method of claim 5, further comprising:
   receiving a user input selecting an avatar of the one or more third user accounts placed in the 360-degree view image; and
   in response to the user input selecting the avatar of the one or more third user accounts placed in the 360-degree view image, outputting at least one of information on clothes the selected avatar is wearing and a gesture set for the selected avatar.

7. The method of claim 5, further comprising outputting, in the first avatar space, an interface that enables a chat with the one or more third user accounts.

8. The method of claim 5, further comprising:
   receiving a user input selecting an avatar of the one or more third user accounts placed in the 360-degree view image; and
   transmitting a request for one-to-one conversation with the selected avatar.

9. The method of claim 5, further comprising:
   receiving a user input selecting a voice-related indication displayed around one of the avatars of one or more third user accounts placed in the 360-degree view image; and
   in response to the user input selecting the voice-related indication, outputting a voice message associated with the one of the avatars of one or more third user accounts placed in the 360-degree view image.

10. The method of claim 5, further comprising capturing an image of the avatar of the first user account and the avatar of the one or more third user accounts in the first avatar space.

11. The method of claim 1, further comprising:
    outputting a plurality of candidate gestures associated with the avatar of the first user account;
    selecting one of the outputted plurality of candidate gestures; and
    outputting the first avatar space including the avatar of the first user account applied with the selected gesture.

12. The method of claim 1, wherein the first avatar space comprises one or more items, and
    wherein the method further comprises:

acquiring, by the avatar of the first user account, one of the one or more items in the first avatar space; and outputting the first avatar space in which the avatar of the first user account applied with the acquired of the one or more items in the first avatar space is placed.

13. The method of claim 1, wherein the first avatar space comprises an indoor view of a store, and wherein the method further comprises:

receiving, by the avatar of the first user account, a user input selecting at least one of a plurality of products provided by the store in the first avatar space; and transmitting a purchase request for the selected at least one of the plurality of products.

14. The method of claim 1, wherein the receiving the information on the one or more avatar spaces comprises:

receiving information on a search word associated with at least one of the place or the event; and receiving information on one or more avatar spaces searched based on the search word.

15. The method of claim 14, wherein the information on the one or more avatar spaces comprises a list of a plurality of avatar spaces, and wherein the list of the plurality of avatar spaces is sorted and output according to a predetermined criterion.

16. A non-transitory computer-readable recording medium storing instructions that, when executed by one or more processors, cause the one or more processors to:

receive information on one or more avatar spaces, wherein the one or more avatar spaces are associated with at least one of a place and an event, wherein the one or more avatar spaces are created based on a 360-degree view, and wherein the 360-degree view is a pre-stored street-view obtained by capturing images of surroundings of a real place; and in response to a user input selecting the information on the one or more avatar spaces, output a first avatar space that is created such that an avatar of a first user account associated with a user terminal is placed in a 360-degree view image associated with at least one of the place and the event, wherein the avatar of the first user account is placed in a predetermined area in the 360-degree view image, and wherein the instructions further cause the one or more processors to:

in response to a user input selecting a movement-related arrow indication in the 360-degree view image in the first avatar space, output a second avatar space in which map information of the 360-degree view image is changed while the avatar of the first user account remains to be placed in the predetermined area, prior to outputting the first avatar space, receive candidate parts to be applied to the avatar of the first user account, wherein the candidate parts are associated with at least one of the first avatar space and a current viewpoint; and in response to a user input selecting one of the received candidate parts, output a third avatar space comprising an avatar applied with the selected one of the received candidate parts.

17. An information processing system, comprising:

at least one memory storing instructions, and at least one processor configured to execute the instructions to:

transmit information on one or more avatar spaces, wherein the one or more avatar spaces are associated with at least one of a place and an event, wherein the one or more avatar spaces are formed based on a 360-degree view, and wherein the 360-degree view is a pre-stored street-view obtained by capturing images of surroundings of a real place; and in response to a request from a user terminal selecting information on the one or more avatar spaces, transmit a 360-degree view image associated with at least one of the place and the event to the user terminal, and generate a first avatar space such that an avatar of a first user account associated with the user terminal is placed in the 360-degree view, wherein the avatar of the first user account is placed in a predetermined area in the 360-degree view image, and wherein the at least one processor further configured to execute the instructions to:

in response to a user input selecting a movement-related arrow indication in the 360-degree view image in the first avatar space, output a second avatar space in which map information of the 360-degree view image is changed while the avatar of the first user account remains placed in the predetermined area, prior to outputting the first avatar space, receive candidate parts to be applied to the avatar of the first user account, wherein the candidate parts are associated with at least one of the first avatar space and a current viewpoint; and in response to a user input selecting one of the received candidate parts, output a third avatar space comprising an avatar applied with the selected one of the received candidate parts.

18. The information processing system of claim 17, wherein the first avatar space comprises an avatar of one or more second user accounts placed in the 360-degree view image, and wherein the first user account is different from the one or more second user accounts.

* * * * *